(12) United States Patent
Lee et al.

(10) Patent No.: US 12,224,433 B2
(45) Date of Patent: Feb. 11, 2025

(54) NEGATIVE ELECTRODE FOR LITHIUM SECONDARY BATTERY WITH IMPROVED SAFETY OR INTERNAL SHORT, LITHIUM SECONDARY BATTERY CONTAINING THE SAME AND LITHIUM SECONDARY BATTERY SYSTEM THEREFOR

(71) Applicant: LG Energy Solution, Ltd., Seoul (KR)

(72) Inventors: Seong Kyu Lee, Daejeon (KR); Suk Woo Lee, Daejeon (KR); Jun Min Kim, Daejeon (KR); Kyoung Min Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/436,819

(22) Filed: Feb. 8, 2024

(65) Prior Publication Data

US 2024/0421287 A1   Dec. 19, 2024

(30) Foreign Application Priority Data

Jun. 19, 2023   (KR) .................. 10-2023-0078158

(51) Int. Cl.
| | | |
|---|---|---|
| *H01M 4/36* | (2006.01) | |
| *H01M 4/02* | (2006.01) | |
| *H01M 4/38* | (2006.01) | |
| *H01M 4/46* | (2006.01) | |
| *H01M 4/62* | (2006.01) | |
| *H01M 10/052* | (2010.01) | |
| *H01M 10/42* | (2006.01) | |
| *H01M 10/44* | (2006.01) | |
| *H01M 10/48* | (2006.01) | |

(52) U.S. Cl.
CPC ........... *H01M 4/366* (2013.01); *H01M 4/386* (2013.01); *H01M 4/463* (2013.01); *H01M 4/623* (2013.01); *H01M 10/052* (2013.01); *H01M 10/441* (2013.01); *H01M 10/448* (2013.01); *H01M 10/486* (2013.01); *H01M 2004/027* (2013.01); *H01M 10/4235* (2013.01)

(58) Field of Classification Search
None
See application file for complete search history.

(56) References Cited

U.S. PATENT DOCUMENTS

| | | | |
|---|---|---|---|
| 2004/0029014 A1* | 2/2004 | Hwang | H01M 4/136 429/251 |
| 2010/0216022 A1* | 8/2010 | Sano | H01M 4/622 429/212 |
| 2011/0143174 A1 | 6/2011 | Kim et al. | |
| 2015/0050533 A1 | 2/2015 | Nam et al. | |
| 2015/0303463 A1 | 10/2015 | Sasaki | |
| 2017/0207450 A1 | 7/2017 | Takahashi et al. | |
| 2019/0023148 A1 | 1/2019 | Komiyama et al. | |
| 2021/0028447 A1 | 1/2021 | Takahashi et al. | |
| 2022/0302442 A1* | 9/2022 | Lee | H01M 4/0404 |
| 2023/0135612 A1 | 5/2023 | Zhang et al. | |
| 2023/0223652 A1 | 7/2023 | Otohata | |
| 2024/0291048 A1* | 8/2024 | Lee | H01M 10/486 |

FOREIGN PATENT DOCUMENTS

| | | | | |
|---|---|---|---|---|
| EP | 3690993 A1 * | 8/2020 | | H01M 10/052 |
| JP | 2010160982 A | 7/2010 | | |
| JP | 2011076822 A | 4/2011 | | |
| JP | 2012243434 A | 12/2012 | | |
| JP | 6094840 B2 | 3/2017 | | |
| JP | 6689996 B2 | 4/2020 | | |
| JP | 2021197249 A | 12/2021 | | |
| KR | 20110067565 A | 6/2011 | | |
| KR | 20150082257 A | 7/2015 | | |
| KR | 20170031141 A | 3/2017 | | |
| KR | 20200037221 A | 4/2020 | | |
| KR | 102258082 B1 | 5/2021 | | |
| KR | 20210054930 A | 5/2021 | | |
| KR | 20230043126 A | 3/2023 | | |

OTHER PUBLICATIONS

International Search Report for PCT/KR2024/001541 mailed May 2, 2024, 3 pages. [See p. 2-3, categorizing the cited references].

* cited by examiner

*Primary Examiner* — Anca Eoff

(74) *Attorney, Agent, or Firm* — Lerner David LLP

(57) ABSTRACT

A negative electrode for a lithium secondary battery includes: a negative electrode active layer provided on at least one surface of a negative electrode current collector, and including a negative electrode active material; and a coating layer disposed on the negative electrode active layer. The coating layer contains silicon-containing particles, aluminum-containing particles and a dispersant, and a volume resistance of the coating layer is about $1.0 \times 10^{-4}$ Ω·cm to 1.0 Ω·cm.

16 Claims, 7 Drawing Sheets

NEGATIVE ELECTRODE FOR LITHIUM SECONDARY BATTERY WITH IMPROVED SAFETY OR INTERNAL SHORT, LITHIUM SECONDARY BATTERY CONTAINING THE SAME AND LITHIUM SECONDARY BATTERY SYSTEM THEREFOR

CROSS-REFERENCE TO RELATED APPLICATIONS

This application is based on and claims priority from Korean Patent Application No. 10-2023-0078158, filed on Jun. 19, 2023, with the Korean Intellectual Property Office, the disclosure of which is incorporated herein in its entirety by reference.

TECHNICAL FIELD

The present disclosure relates to a negative electrode for a lithium secondary battery, a lithium secondary battery containing the same, and a lithium secondary battery system therefor.

BACKGROUND

Lithium secondary batteries generate electric energy through oxidation and reduction reactions when lithium ions are intercalated/deintercalated at a positive electrode and a negative electrode. Lithium secondary batteries are manufactured by using materials allowing lithium ions to be reversibly intercalated and deintercalated, as active materials for the positive electrode and the negative electrode, respectively, and filling an organic electrolyte or a polymer electrolyte between the positive electrode and the negative electrode.

Such lithium secondary batteries are charged/discharged through electrochemical reactions in which ions are deintercalated/intercalated and moved between active materials of both electrodes. However, when secondary batteries are repeatedly charged/discharged, heat is generated by, for example, electrical misuse (overcharging) or other dangerous factors. When such a state is continued, the lithium secondary battery will be destroyed and exploded, causing a damage to a user, so that safety measures for the heat generation is necessary (See, e.g., Korean Patent Laid-Open Publication Nos 10-2011-0067565 and 10-2021-0054930).

SUMMARY

The present disclosure provides a technology related to a lithium secondary battery, which can secure battery safety in the event of an internal short of the lithium secondary battery.

According to one embodiment of the present disclosure, a negative electrode for a lithium secondary battery includes: a negative electrode active layer provided on at least one surface of a negative electrode current collector, and including a negative electrode active material; and a coating layer disposed on the negative electrode active layer. The coating layer contains silicon-containing particles, aluminum-containing particles and a dispersant, and a volume resistance of the coating layer is about $1.0 \times 10^{-4}$ Ω·cm to 1.0 Ω·cm.

The negative electrode may have a volume resistance of about $3.0 \times 10^{-3}$ Ω·cm to $9.0 \times 10^{-1}$ Ω·cm.

Also, the silicon-containing particles contained in the coating layer may contain particles in which a ratio of a silicon element and an oxygen element is about 1:0.5 to 2.0.

Further, the silicon-containing particles may have an average particle size ($D_{50}$) of about 0.5 μm to 10 μm, and the aluminum-containing particles may have an average particle size ($D_{50}$) of about 0.1 μm to 3.0 μm.

Also, the silicon-containing particles may include a carbon layer on surfaces thereof.

In addition, the aluminum-containing particles contained in the coating layer may contain a metal compound represented by the following Formula 1:

in the Formula 1, p is an integer of 1 to 10, q is an integer of 0 to 20, and p≤q, and r is an integer of 1 to 5.

As an example, the aluminum-containing particles may include one or more types of boehmite, Pseudoboehmite, diaspore, akdalaite and aluminium trihydroxide.

Also, the coating layer may contain about 1% to 30% by weight of silicon-containing particles; about 30% to 89% by weight of aluminum-containing particles; and about 10% to 40% by weight of dispersant relative to a total weight.

Meanwhile, the dispersant contained in the coating layer may include: a first dispersant including one or more carboxylic acid groups; and a second dispersant including one or more amino groups.

Also, the coating layer may further include one or more types of binders among styrene butadiene rubber (SBR), polyvinylidenefluoride (PVdF), polyacrylic acid (PAA), polyalkylacrylate, polyamide (PA) and polystyrene (PS).

Also, according to one embodiment of the present disclosure, a lithium secondary battery includes a positive electrode, the above-mentioned negative electrode according to the present disclosure, and a separator disposed between the positive electrode and the negative electrode.

The positive electrode may include a positive electrode active layer on a positive electrode current collector, the positive electrode active layer containing one or more types of positive electrode active materials among compounds represented by the following Formulas 2 and 3:

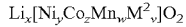

In the Formulas 2 and 3, $M^1$ is one or more types of elements selected from the group consisting of W, Cu, Fe, V, Cr, Co, Ni, Mn, Ti, Zr, Zn, Al, In, Ta, Y, La, Sr, Ga, Sc, Gd, Sm, Ca, Ce, Nb, Mg, B, and Mo, X is one or more types selected from the group consisting of P, Si, S, As and Sb, a satisfies 0<a≤1.0, $M^2$ is one or more types of elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w and v satisfy 1.0≤x≤1.30, 0≤y<1, 0≤z≤1, 0≤w≤1, 0≤v≤0.1, respectively, and y+z+w+v=1.

Further, according to one embodiment of the present disclosure, a lithium secondary battery system includes: cell assemblies each including above-mentioned n (where n is an integer of 3 to 100) lithium secondary batteries according to the present disclosure; a charging/discharging unit electrically coupled to each of the cell assemblies to individually charge or discharge each of the cell assemblies; a sensing unit electrically coupled to an electrode of each lithium secondary battery included in the cell assemblies to individually measure at least one type of electricity amount between an electric voltage and an electric current of the secondary battery during charging/discharging of each lithium secondary battery; and a controller electrically coupled to the charging/discharging unit and the sensing unit to control charging or discharging of each of the cell assemblies. When the electricity amount measured by the sensing unit satisfies a predetermined value, the controller stops charging or discharging of a cell assembly including a corresponding lithium secondary battery.

The controller may include a memory and a processor coupled to the memory, and may perform: selecting a cell assembly having error rate of about 5% or more, in comparison between an average electricity amount of the cell assemblies and an electricity amount of an individual cell assembly; among individual lithium secondary batteries provided in the corresponding selected cell assembly, determining that an internal short has occurred in a corresponding lithium secondary battery whose electricity amount measured by the sensing unit is lower than an applied electricity amount of each lithium secondary battery by about 0.5% or more; and stopping charging or discharging of the cell assembly including the corresponding lithium secondary battery determined to be internally short-circuited.

Also, the sensing unit may further include a temperature measurement sensor configured to measure a temperature of each lithium secondary battery provided in the cell assembly.

Further, according to one embodiment of the present disclosure, a method of operating a lithium secondary battery system includes: selecting a cell assembly whose error rate is about 5% or more, in comparison between an average electricity amount of cell assemblies and an electricity amount of an individual cell assembly; among individual lithium secondary batteries provided in the corresponding selected cell assembly, determining that an internal short has occurred in a corresponding lithium secondary battery whose electricity amount measured by a sensing unit is lower than an applied electricity amount of each lithium secondary battery by about 0.5% or more; and stopping charging or discharging of the cell assembly including the corresponding lithium secondary battery determined to be internally short-circuited.

Further, according to one embodiment of the present disclosure, a non-transitory computer-readable storage medium storing a program for executing a method of operating a lithium secondary battery system, the method including: selecting a cell assembly whose error rate is about 5% or more, in comparison between an average electricity amount of cell assemblies and an electricity amount of an individual cell assembly; among individual lithium secondary batteries provided in the corresponding selected cell assembly, determining that an internal short has occurred in a corresponding lithium secondary battery whose electricity amount measured by a sensing unit is lower than an applied electricity amount of each lithium secondary battery by about 0.5% or more; and stopping charging or discharging of the cell assembly including the corresponding lithium secondary battery determined to be internally short-circuited.

Since the negative electrode for the lithium secondary battery according to the present disclosure includes silicon-containing particles and aluminum-containing particles of specific components, it is possible to achieve a predetermined volume resistance. Accordingly, in the lithium secondary battery including the negative electrode, it is possible to achieve appropriate insulation on the negative electrode surface and to leak a predetermined current in the event of an internal short, and thus it is possible to prevent melt-down phenomenon and/or rapid heat generation of the lithium secondary battery in the event of the internal short.

Also, since the lithium secondary battery system according to the present disclosure includes the above-mentioned lithium secondary battery of the present disclosure, in the event of the internal short, not only melt-down phenomenon and rapid heat generation can be prevented, but also an occurrence of the internal short can be quickly determined through a predetermined current leaked from the lithium secondary battery. Then, it is possible to preemptively control the operation before thermal runaway occurs in the corresponding lithium secondary battery, and thus there is an advantage in that the safety problems caused by the internal short are improved over the conventional lithium secondary battery.

Figure 1:
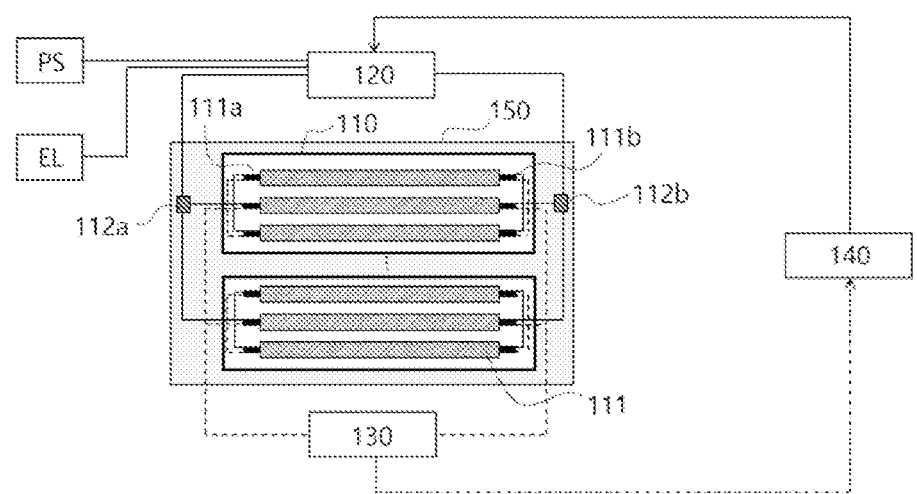
FIG. 1 is a structural diagram schematically illustrating the configuration of a lithium secondary battery system according to the present disclosure.

Corresponding reference characters indicate corresponding components throughout the several views of the drawings. Skilled artisans will appreciate that elements in the drawings are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

For the present disclosure, various changes may be made and various embodiments may be included, and then embodiments will be described in detail in the detailed description.

However, this is not intended to limit the present disclosure to specific embodiments, and should be understood to include all changes, equivalents and substitutes included in the spirit and technical scope of the present disclosure.

In the present disclosure, it should be understood that terms such as "include" or "have" are intended to specify that features, numbers, steps, actions, components, parts or combinations thereof described in the specification are present, and do not preclude possibilities of presence or addition of one or more other features or numbers, steps, actions, components, parts or combinations thereof, in advance.

Also, in the present disclosure, when a portion such as a layer, a film, a region, or a plate is described as being "on" another portion, this includes not only a case where it is present "directly above" another portion, but also a case where there is another portion in between. Conversely, when a portion such as a layer, a film, a region, or a plate is described as being "under" another portion, this includes not only a case where it is present "directly below" another portion, but also a case where there is another portion in between. Also, in this application, being placed "on" may include not only a case of being placed on the top, but also a case of being placed on the bottom.

Also, in the present disclosure, the "electricity amount" refers to the amount of electricity flowing through electrodes during charging or discharging of a lithium secondary battery, which can be quantified as a current and/or a voltage.

In addition, in the present disclosure, $D_{50}$ may be defined as a particle size corresponding to 50% of the cumulative volume in the particle size distribution curve of each particle (the graph curve of a particle size distribution chart). The $D_{50}$ may be measured using, for example, a laser diffraction method. In the laser diffraction method, in general, it is possible to measure particle sizes ranging from a submicron region to about several millimeters, and to obtain results with high reproducibility and high resolution.

"About", "approximately", and "substantially" used in the present specification are used to mean ranges of numerical values or degrees or approximations thereof, taking into account inherent manufacturing and material tolerances, and are used to prevent infringers from unfairly using the disclosed contents in which precise or absolute figures provided to aid the understanding of the present disclosure are mentioned.

In secondary batteries, a porous separator installed between a positive electrode and a negative electrode is employed as an example of a safety measure. When the temperature inside the casing rises above the safe temperature, this porous separator closes the pores in response to the temperature, and blocks ion movement between both electrodes, so that an electrochemical reaction is suppressed and the safety is implemented (shut-down phenomenon).

However, when the temperature inside the battery excessively rises beyond the temperature release rate of the casing due to the separator unevenness or other internal short (e.g., short-circuit) causes, the separator itself melts and loses its function of insulating a positive electrode from a negative electrode before the shutdown phenomenon of the separator occurs. Also, when the positive electrode and the negative electrode are short-circuited, a chain reaction (melt-down) such as decomposition of a negative electrode active material and an electrolyte, and decomposition of a positive electrode active material progresses, and then a thermal runaway phenomenon is reached. The thermal runaway phenomenon causes problems depending on situations. That is, not only an explosion is caused in the corresponding secondary battery in which the short has occurred, but also a melt-down phenomenon is induced in a secondary battery adjacent to the corresponding secondary battery, thereby causing additional explosion.

The melt-down phenomenon is induced when an internal short occurs due to a contact between electrodes included in the secondary battery, between an electrode and an electrode current collector and/or between current collectors. For example, when a short occurs due to a contact between a positive electrode current collector (or a positive electrode surface) and a negative electrode, the amount of generated heat rapidly increases by the resistance value of the short portion, and the thermal runaway phenomenon is reached in a relatively short time. Thus, in this situation, in order to realize the stability of the lithium secondary battery, a means for preventing, suppressing and/or responding to such a thermal runaway phenomenon is needed.

Hereinafter, the present disclosure will be described in more detail.

Negative Electrode for Lithium Secondary Battery

According to one embodiment of the present disclosure, a negative electrode for a lithium secondary battery includes: a negative electrode active layer provided on at least one surface of a negative electrode current collector, and including a negative electrode active material; and a coating layer located on the negative electrode active layer. The coating layer contains silicon-containing particles, aluminum-containing particles and a dispersant, and a volume resistance is about $1.0 \times 10^{-4}$ Ω·cm to 1.0 Ω·cm.

The negative electrode for the lithium secondary battery according to the present disclosure has a structure in which a negative electrode active layer containing a negative electrode active material and a coating layer are sequentially stacked on a negative electrode current collector.

The negative electrode may have a predetermined volume resistance since a coating layer containing silicon-containing particles and aluminum-containing particles is provided on the surface of the negative electrode active layer containing a carbon-based negative electrode active material. For example, the coating layer may have a volume resistance of about $1.0 \times 10^{-4}$ Ω·cm or more, for example, about $1.0 \times 10^{-4}$ Ω·cm to 1.0 Ω·cm. For example, the coating layer may have a volume resistance of about $5.0 \times 10^{-4}$ Ω·cm to 1.0 Ω·cm; $1.0 \times 10^{-3}$ Ω·cm to 1.0 Ω·cm; $3.0 \times 10^{-3}$ Ω·cm to 1.0 Ω·cm; $1.0 \times 10^{-2}$ Ω·cm to 1.0 Ω·cm; $3.0 \times 10^{-3}$ Ω·cm to 1.0 Ω·cm; $3.0 \times 10^{-3}$ Ω·cm to $9.0 \times 10^{-1}$ Ω·cm; $5.0 \times 10^{-2}$ Ω·cm to $9.0 \times 10^{-1}$ Ω$^{-1}$·cm; $6.0 \times 10^{-2}$ Ω·cm to $8.0 \times 10^{-1}$ Ω$^{-1}$·cm; $8.0 \times 10^{-2}$ Ω·cm to $5.0 \times 10^{-1}$ Ω$^{-1}$·cm; $4.0 \times 10^{-2}$ Ω·cm to $2.0 \times 10^{-1}$ Ω$^{-1}$·cm; $5.0 \times 10^{-2}$ Ω·cm to $1.5 \times 10^{-1}$ Ω$^{-1}$·cm; $8.0 \times 10^{-2}$ Ω·cm to $1.0 \times 10^{-1}$ Ω·cm; $7.0 \times 10^{-2}$ Ω·cm to $9.0 \times 10^{-2}$ Ω·cm; $7.0 \times 10^{-2}$ Ω·cm to $4.5 \times 10^{-1}$ Ω·cm; $7.0 \times 10^{-2}$ Ω·cm to $3.0 \times 10^{-1}$ Ω·cm; $8.0 \times 10^{-2}$ Ω·cm to $2.0 \times 10^{-1}$ Ω·cm; $1.0 \times 10^{-1}$ Ω·cm to $9.0 \times 10^{-1}$ Ω·cm; $1.0 \times 10^{-1}$ Ω·cm to $5.0 \times 10^{-1}$ Ω·cm; $2.0 \times 10^{-1}$ Ω·cm to $8.0 \times 10^{-1}$ Ω·cm; or $5.0 \times 10^{-1}$ Ω·cm to 1.0 Ω·cm.

In the negative electrode, when the volume resistance exceeds about 1.0 Ω·cm, an excessive resistance is generated on a negative electrode surface in the event of an internal short caused by a contact between the negative electrode surface and a positive electrode current collector (and/or a positive electrode active layer), and then the amount of current applied to the outside of the electrode may be significantly reduced or the current may be completely prevented from flowing. Accordingly, the short-circuit current of the corresponding lithium secondary battery is blocked, but there is a problem that it is not easy to selectively detect and respond to an internally short-circuited lithium secondary battery within a relatively short time, in a device including a plurality of lithium secondary batteries, such as a battery module or pack. Also, in order to respond to the occurrence of the internal short, a cell assembly including the corresponding lithium secondary battery in which the internal short has occurred has to be separated and/or removed from the lithium secondary battery system, and thus there is a problem of low economic feasibility. Also, when the volume resistance of the negative electrode is less than the lower limit of above-mentioned range, sufficient insulation is not achieved on the negative electrode surface in the event of the internal short. Thus, there is a problem that a melt-down phenomenon such as decomposition of a negative electrode active material and an electrolyte, and decomposition of a positive electrode active material occurs, and as a result, ignition may occur.

That is, the negative electrode of the present disclosure has a volume resistance satisfying the above-mentioned range, so that an appropriate resistance is provided to the negative electrode surface in the event of the internal short to achieve insulation at the short-circuit point. Accordingly, heat generation of the corresponding lithium secondary battery can be significantly reduced in the event of the internal short, thereby delaying the occurrence of a melt-down phenomenon. Also, by suppressing the heat generation of the corresponding lithium secondary battery in which the internal short has occurred, it is possible to prevent additional heat generation and/or melt-down phenomenon in adjacent lithium secondary batteries. Thus, the time for responding to (or treating) the problem caused by the internal short-circuit can be secured. Furthermore, since a significantly small amount of current (that is, leakage current) is allowed to flow through the internally short point of the corresponding lithium secondary battery, an abnormal operation such as an internal short can be easily determined/diagnosed. Thus, there is an advantage in that it is relatively easy to respond to the abnormal operation of the corresponding lithium secondary battery.

For the negative electrode according to the present disclosure, in order to satisfy the above-mentioned range of the volume resistance, parameters such as, for example, components forming the coating layer, the content of each component, the mixture form and size of each component, and the thickness ratio of the negative electrode active layer and the coating layer may be controlled.

The afore-mentioned coating layer does not act as a resistance layer during a normal operation of the lithium secondary battery so that an overvoltage does not occur during charging/discharging. Meanwhile, during an abnormal operation such as an internal short, the coating layer acts as a resistance layer that prevents current from directly flowing between the negative electrode active layer and the positive electrode active layer and/or the negative electrode active layer and the positive electrode current collector due to a contact between these, and also has a function of leaking a substantially small amount of current. For this, the coating layer may have a form in which the coating layer is coated on the negative electrode active layer to cover the entire exposed surface of the negative electrode active layer, or in some cases, may be selectively disposed only on the edge and/or the end surface of the negative electrode active layer that easily comes in contact with the positive electrode current collector (and/or the positive electrode active layer, etc.), or may be selectively disposed only at the center of the negative electrode active layer that may meet (touch) the positive electrode current collector (and/or the positive electrode active layer, and the like.) when the separator is damaged by an external force.

Also, since the coating layer contains the silicon-containing particles and the aluminum-containing particles, it is possible to achieve such a volume resistance that a current is prevented from directly flowing due to a contact between the negative electrode active layer and the positive electrode active layer and/or the negative electrode active layer and the positive electrode current collector, and a predetermined current can be leaked in the event of an internal short.

The "silicon-containing particles" stands for particles containing a silicon element (Si) among metal components, as a main component. Examples of such silicon-containing particles may include silicon particles, silicon carbide particles, and silicon oxide particles, but may include silicon oxide particles in an oxidized form. Here, the silicon-containing particles may include a silicon element and an oxygen element, in which their molar ratio may be about 1:0.5 to 2.0, 1:0.5 to 1.5; 1:0.8 to 1.2; or 1:0.9 to 1.1.

The form of the silicon-containing particles is not particularly limited as long as the element molar ratio of the silicon element to the oxygen element within the particles satisfies the above range. For example, the silicon-containing particles may be particles of silicon monoxide ($SiO_q$, where $0.8 \leq q \leq 1.2$).

In the present disclosure, the element ratio of the silicon element to the oxygen element (i.e., the molar ratio of elements) is controlled as mentioned above, so that the volume resistance of the coating layer composed of the silicon-containing particles may be controlled to satisfy the above-mentioned predetermined range. Thus, in the event of an internal short, insulation can be provided to the coating layer surface, and at the same time, a trace amount of current can be leaked to the inside and/or outside of the battery.

For example, when the ratio of the silicon element is higher than the ratio of the oxygen element, insulation is deteriorated and a leakage current is excessively applied at the internally short-circuited point. This causes a problem that the resistance of the internally short-circuited point increases and the temperature of the lithium secondary battery rapidly rises. Also, when the ratio of the silicon element is lower than the ratio of the oxygen element, the band gap of the silicon-containing particles increases, so that a leakage current is completely blocked in the event of the internal short. This makes it difficult to selectively determine/diagnose the corresponding lithium secondary battery in which the internal short has occurred.

Meanwhile, the silicon-containing particles have a chemical structure where lithium ions can be inserted during charging of a lithium secondary battery, and have been conventionally applied as a silicon-based negative electrode active material to be applied to a negative electrode active layer. However, when the silicon-containing particles are applied to the coating layer of the present disclosure, the surface area into which lithium ions are inserted may be significantly reduced due to a low content ratio, as compared to the case where the silicon-containing particles are applied to the negative electrode active layer. This means that the resistance of the silicon-containing particles against lithium insertion, which occurs in the coating layer, increases. Therefore, unlike in the general silicon-based negative electrode active material, when the silicon-containing particles are applied to the coating layer of the present disclosure, it may be difficult to insert lithium ions during charging of the lithium secondary battery.

Furthermore, the silicon-containing particles can readily perform a function of providing insulation to the coating layer surface, and at the same time, leaking a trace amount of current to the inside and/or outside of the battery in the event of the internal short. However, the silicon-containing particles require a high manufacturing cost. Also, there is a limitation in that when the silicon-containing particles are used alone, the content of the silicon-containing particles to be applied into the coating layer has to be high, e.g., about 50% by weight or more so as to provide insulation to the coating layer surface and to leak a trace amount of current to the inside and/or outside of the battery. Therefore, in the present disclosure, the coating layer contains aluminum-containing particles together with the silicon-containing particles.

The "aluminum-containing particles" stand for particles containing an aluminum element (Al) among metal components, as a main component. The aluminum-containing particles according to the present disclosure require a relatively less expensive manufacturing cost, and have a relatively low electrical conductivity, and thus the effect of leaking a trace amount of current to the inside and/or outside of the battery is significantly low when the aluminum-containing particles are applied alone to the coating layer. However, as compared to the case where the silicon-containing particles are included alone in the coating layer, when the aluminum-containing particles are mixed with the silicon-containing particles at a predetermined weight ratio and applied to the coating layer, an equal or superior effect is exhibited. Thus, there is an advantage in that the economic feasibility is increased in mass production.

Such aluminum-containing particles may be particles containing a metal compound represented by the following Formula 1:

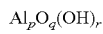  [Chemical Formula 1]

$Al_pO_q(OH)_r$ in the Formula 1,
p is an integer of 1 to 10, q is an integer of 0 to 20, and p≤q, and
r is an integer of 1 to 5.

Aluminum oxide ($Al_2O_3$) has been conventionally applied to an electrode insulating layer and contains an aluminum element as a metal component and an oxygen element as a non-metal component. When aluminum oxide is applied to the coating layer together with the silicon-containing particles, a current leaking to the inside and/or outside of the battery is completely blocked during the internal short. However, in the present disclosure, the aluminum-containing particles, in the form of particles having crystals of aluminum oxide hydroxide as in the Formula 1, are included in the coating layer, together with the silicon-containing particles, so that insulation can be provided to the coating layer surface, and at the same time a trace amount of current can be leaked to the inside and/or outside of the battery in the event of the internal short.

Examples of these aluminum-containing particles may include particles containing one or more types of boehmite (γ-AlO(OH)), pseudoboehmite (AlO(OH)), diaspore (α-AlO(OH)), akdalaite ($Al_{10}O_1(OH)_2$) and aluminium trihydroxide.

Also, the particle size of the silicon-containing particles may be controlled to satisfy a specific size. For example, the silicon-containing particles may have an average particle size ($D_{50}$) of about 0.5 μm to 10 μm, or may have an average particle size ($D_{50}$) of about 2 μm to 10 μm; 2 μm to 5 μm; 3 μm to 9 μm; 3 μm to 7 μm; 5 μm to 0 μm; 5 μm to 8 μm; 7.5 μm to 0 μm; 5 μm to 7.5 μm; 6 μm to 8 μm; or 6 μm to 7 μm.

When the average particle size ($D_{50}$) of the silicon-containing particles is less than the above-mentioned range, the silicon-containing particles tend to penetrate into the negative electrode active layer arranged under the coating layer. Accordingly, the electrical resistance at the interface between the negative electrode active layer and the coating layer increases, and then the electrical performance may be deteriorated during a normal operation of the lithium secondary battery. Also, when the average particle size ($D_{50}$) of the silicon-containing particles exceeds the above-mentioned range, it is difficult to form a uniform coating layer. In order to uniformly form the coating layer, the average thickness of the coating layer is excessively increased, which causes a problem that the energy density of the negative electrode is lowered.

Also, the aluminum-containing particles may have an average particle size ($D_{50}$) of about 0.1 μm to 3.0 μm. For example, the aluminum-containing particles may have an average particle size ($D_{50}$) of about 0.1 μm to 2.0 μm; 0.1 μm to 0.9 μm; 0.5 μm to 1.5 μm; 0.3 μm to 0.9 μm; 0.5 μm to 0.9 μm; 0.3 μm to 0.7 μm; 0.4 μm to 0.8 μm; 0.1 μm to 0.7 μm; 0.1 μm to 0.5 μm; 0.2 μm to 0.4 μm; or 0.25 μm to 0.35 μm.

When the average particle size ($D_{50}$) of the aluminum-containing particles is less than the above-mentioned range, the dispersibility of the aluminum-containing particles is decreased, so that the aluminum-containing particles may be included in the coating layer, in a non-uniformly aggregated form. Accordingly, there is a problem that electrical properties of the coating layer are deteriorated. Also, when the average particle size ($D_{50}$) of the aluminum-containing particles exceeds the above-mentioned range, it is difficult to form the coating layer into a thin film, and thus there is a limitation in that the energy density of the negative electrode decreases.

Also, the silicon-containing particles may include a carbon layer on the surfaces thereof in order to improve the energy density and the energy efficiency of the negative electrode during a normal operation of the lithium secondary battery. The carbon layer may have a form in which silicon-containing particles and carbon particles are uniformly mixed and then the carbon particles are physically and chemically adsorbed on the surfaces of the silicon-containing particles. In some cases, the carbon layer may also have a form in which carbon atoms are deposited on the surfaces of the silicon-containing particles. The carbon layer can improve the electrical conductivity of the particle surfaces while suppressing the volume expansion of the silicon-containing particles. Accordingly, in the coating layer, the insulation of the coating layer is somewhat reduced in the event of the internal short of the lithium secondary battery, whereas the charging/discharging capacity and the efficiency can be improved and the volume change of the negative electrode can be minimized during a normal operation of the lithium secondary battery.

Also, the average thickness of the carbon layer may be about 1 nm to 1,000 nm, and may be, for example, about 100 nm to 1,000 nm; 200 nm to 1,000 nm; 500 nm to 1,000 nm; 800 nm to 1,000 nm; 10 nm to 200 nm; 10 nm to 90 nm; 10 nm to 70 nm; 10 nm to 50 nm; or 10 nm to 30 nm.

Also, the coating layer may include a dispersant together with the silicon-containing particles and the aluminum-containing particles. The dispersant performs a role of uniformly dispersing the silicon-containing particles and the aluminum-containing particles inside the coating layer without aggregation.

For example, the dispersant may include a first dispersant and a second dispersant. The first dispersant interacts with respective metals contained in the silicon-containing particles and the aluminum-containing particles, so that the particle surface is stabilized and then the aggregation of particles is prevented. The second dispersant assists each particle dispersed by the first dispersant to maintain its dispersed state.

The first dispersant may include one or more carboxylic acid groups, and the second dispersant may include one or more amino groups.

For example, the first dispersant may include: tricarboxylic acids such as citric acid, methane tricarboxylic acid, ethane tricarboxylic acid, benzene-1,3,5-tricarboxylic acid, and 5-sulfo-1,2,4-benzenetricarboxylic acid; tetracarboxylic acids such as ethane-1,1,2,2-tetracarboxylic acid, propane-1,1,2,3-tetracarboxylic acid, butane-1,2,3,4-tetracarboxylic acid, cyclopentane-1,2,3,4-tetracarboxylic acid, and benzene-1,2,4,5-tetracarboxylic acid; pentacarboxylic acids such as benzene-1,2,3,4,5-pentacarboxylic acid; or hexacarboxylic acids such as benzene-1,2,3,4,5,6-hexacarboxylic acid (=mellitic acid).

Also, the second dispersant may include ethylene diamine, piperazine, hexamethylenediamine, 1,3-diaminopropane, bishexamethylenetriamine, diethylenetriamine, etc.

Also, since the electrical properties of the coating layer are greatly influenced by the silicon-containing particles, the dispersant contained in the coating layer may be contained in the coating layer at a predetermined ratio based on the weight of the silicon-containing particles. For example, the dispersant may be contained in the coating layer at a weight ratio of about 50% to 500% of the total weight of the silicon-containing particles, and may be contained in the coating layer at a weight ratio of, for example, about 80% to 500%; 50% to 90%; 110% to 190%; 110% to 300%; 150% to 250%; or 180% to 220% of the total weight of the silicon-containing particles. In the present disclosure, by adjusting the content of the dispersant within the above range, it is possible to prevent aggregation of the silicon-containing particles, which is caused by a very small amount of dispersant and to prevent deterioration of electrical properties of the coating layer, which is caused by an excessive amount of dispersant.

Further, the first dispersant and the second dispersant contained in the dispersant may be included in the dispersant at a weight ratio of about 1:0.5 to 2.0, and may be included at a weight ratio of, for example, about 1:0.5 to 1.2, 1:0.8 to 1.2, or 1:1.1 to 2.0. In the present disclosure, by adjusting the content ratio of the first dispersant and the second dispersant as described above, it is possible to uniformly disperse not only the silicon-containing particles but also the aluminum-containing particles in the coating layer.

Further, the coating layer may include the silicon-containing particles, the aluminum-containing particles and the dispersant at a predetermined content ratio. For example, the coating layer may contain about 1% to 30% by weight of silicon-containing particles; about 30% to 89% by weight of aluminum-containing particles; and about 10% to 40% by weight of dispersant relative to the total weight.

As an example, the coating layer may contain about 10% to 20% by weight of silicon-containing particles; about 50% to 65% by weight of aluminum-containing particles; and about 25% to 30% by weight of dispersant (first dispersant: second dispersant=1:1 (wt./wt.)) relative to the total weight.

As another example, the coating layer may contain about 21% to 30% by weight of silicon-containing particles; about 50% to 64% by weight of aluminum-containing particles; and about 15% to 20% by weight of dispersant (first dispersant:second dispersant=1:1 (wt./wt.)) relative to the total weight.

As another example, the coating layer may contain about 5% to 15% by weight of silicon-containing particles; about 65% to 85% by weight of aluminum-containing particles; and about 10% to 20% by weight of dispersant (first dispersant: second dispersant=1:1 (wt./wt.)) relative to the total weight.

In the present disclosure, the content ratio of each component contained in the coating layer is controlled as described above, so that the negative electrode can include the coating layer in which the silicon-containing particles and the aluminum-containing particles are uniformly dispersed. Also, since the shape stability of the coating layer can be achieved at a high level, it is possible to prevent the coating layer from being damaged during the manufacturing process of the negative electrode or the assembly process of the battery. Also, by controlling the content ratio of each component contained in the coating layer as described above, it is possible to readily control the volume resistance of the negative electrode in a predetermined range according to the present disclosure.

Furthermore, the coating layer may further include one or more types of binders among styrene butadiene rubber (SBR), polyvinylidene fluoride (PVdF), polyacrylic acid (PAA), polyalkylacrylate, polyamide (PA) and polystyrene (PS).

The coating layer according to the present disclosure may include only the silicon-containing particles, the aluminum-containing particles and the dispersant, but may further include one or more types of above-mentioned binders in order to increase adhesion between component particles constituting the coating layer. In this case, the content of the binder may be about 0.1 to 10 parts by weight relative to the total of 100 parts by weight of the coating layer, and may be, for example, about 0.1 parts to 5 parts by weight; 0.1 parts to 3 parts by weight; 0.1 parts to 2 parts by weight; or 0.1 parts to 1 parts by weight relative to the total of 100 parts by weight of the coating layer.

Meanwhile, the average thickness of the coating layer may be about 1.5 μm to 30 μm, and the average thickness may be larger than the average particle size of the silicon-containing particles. For example, the average thickness of the coating layer may be about 1.5 μm to 20 μm; 1.5 μm to 10 μm; 1.5 μm to 5 μm; 1.5 μm to 3 μm; 3 μm to 9 μm; 3 μm to 7 μm; 5 μm to 25 μm; 5 μm to 20 μm; 5 μm to 18 μm; 5 μm to 15 μm; 5 μm to 10 μm; 5 μm to 8 μm; 10 μm to 20 μm; 11 μm to 19 μm; 8 μm to 13 μm; 10 μm to 15 μm; 14 μm to 19 μm; 15 μm to 18 μm; 12 μm to 16 μm; or 11 μm to 14 μm. Here, the average thickness of the coating layer may be measured by a method commonly applied in the art to measure the thickness of a thin film. The average thickness may indicate the average of any values measured in this way or may indicate an intermediate value between the largest value and the smallest value among the measured values.

Also, the thickness ratio of the coating layer to the negative electrode active layer may be about 0.05 to 0.3, and may be, for example, about 0.05 to 0.2; 0.05 to 0.1; 0.05 to 0.09; 0.07 to 0.12; 0.1 to 0.2; 0.15 to 0.25; or 0.15 to 0.2.

The volume resistance of the negative electrode according to the present disclosure may be influenced by i) the volume resistance of the coating layer and ii) the thickness ratio of the negative electrode active layer and the coating layer. Here, as mentioned above, the volume resistance of the coating layer may be controlled by, for example, components forming the coating layer, the content of each component, and the mixture form and size of each component. However, even if the volume resistance of the coating layer is controlled, when the thickness of the negative electrode active layer is excessively thicker than that of the coating layer and the thickness ratio of the coating layer to the negative electrode active layer is less than the above-mentioned lower limit, the volume resistance of the negative electrode is decreased and insulation may be significantly reduced in the event of the internal short. Also, when the thickness of the negative electrode active layer is equal to or smaller than that of the coating layer and the thickness ratio of the coating layer to the negative electrode active layer is larger than the above-mentioned upper limit, the volume resistance of the negative electrode is significantly increased. Therefore, in the event of the internal short, the short-circuit current of the lithium secondary battery is blocked, but it is not easy to selectively detect and respond to an internally short-circuited lithium secondary battery within a short time, in a device including a plurality of lithium secondary batteries, such as a battery module or pack. Then, there is a limitation of low economic feasibility.

That is, in the present disclosure, by adjusting the thickness ratio of the coating layer to the negative electrode active layer, within the above-mentioned range, it is possible to achieve the energy density of the negative electrode at a relatively high level, and to minimize the volume expansion rate of the negative electrode during a normal operation of the lithium secondary battery. In addition, the negative electrode of the present disclosure has an advantage in that the resistance can be prevented from significantly increasing by an excessive thickness and the negative electrode surface can be physically protected during the internal short.

Meanwhile, the negative electrode active layer included in the negative electrode includes a carbon-based negative electrode active material, and the carbon-based negative electrode active material may include carbon-based negative electrode active materials commonly applied in the art. For example, the carbon-based negative electrode active material means a material including carbon atoms as a main component. Such a carbon-based negative electrode active material may include one or more types selected from the group consisting of natural graphite, artificial graphite, expanded graphite, non-graphitized carbon, carbon black, acetylene black and Ketjen black. For example, the carbon-based negative electrode active material may include any one or more of natural graphite, and artificial graphite, but may, for example, include natural graphite, or a mixture of natural graphite and artificial graphite.

Also, the carbon-based negative electrode active material may be a spherical graphite granule formed by gathering a plurality of scaly graphites. Examples of the scaly graphites may include natural graphite, and artificial graphite, and also those obtained by graphitizing for example mesophase calcined carbon (bulk mesophase) and cokes (raw coke, green coke, pitch coke, needle coke, petroleum coke, etc.) in which raw materials are tar and pitch. For example, the carbon-based negative electrode active material may be a granule obtained by using a plurality of natural graphites with high crystallinity. Also, one graphite granule may be formed by gathering 2 to 100 scaly graphites, for example, 3 to 20 scaly graphites.

Also, the carbon-based negative electrode active material may have an average particle size ($D_{50}$) of about 0.5 μm to 20 μm, and may have an average particle size ($D_{50}$) of, for example, 0.5 μm to 15 μm; 0.5 μm to 10 μm; 5 μm to 20 μm; 10 μm to 20 μm; 12 μm to 18 μm; 2 μm to 7 μm; 0.5 μm to 5 μm; or 1 μm to 3 μm.

Also, the negative electrode active layer may optionally further include for example a conductive material, a binder, and other additives as necessary together with the carbon-based negative electrode active material as a main component.

The conductive material may include one or more types of carbon black, acetylene black, Ketjen black, carbon nanotube, carbon fiber, and the like.

As an example, as the conductive material contained in the negative electrode active layer, carbon black, carbon nanotube, carbon fiber, and the like, may be used alone or in combination.

The content of the conductive material may be about 0.1 to 10 parts by weight relative to the total of 100 parts by weight of the negative electrode active layer, or may be, for example, about 0.1 parts to 8 parts by weight, 0.1 parts to 5 parts by weight, 0.1 parts to 3 parts by weight, 2 parts to 6 parts by weight, or 0.5 parts to 2 parts by weight. In the present disclosure, by controlling the content of the conductive material within the above range, it is possible to prevent the increase of the resistance of the negative electrode and the decrease of the charging capacity, which is caused by a low content of conductive material. Also, it is possible to prevent problems caused by an excessive amount of conductive material, such as a decrease in the charging capacity due to a decrease in the content of the negative electrode active material, or a decrease in fast charging characteristics due to an increase in the loading amount of the negative electrode active layer.

Furthermore, the binder may be appropriately applied within a range in which electrical properties of the electrode are not degraded, as a component that assists the binding of the negative electrode active material, the conductive material, etc., and the binding to the current collector. For example, the binder may include any one or more selected from the group consisting of vinylidenefluoride-hexafluoropropylene copolymer (PVDF-co-HFP), polyvinylidenefluoride (PVdF), polyacrylonitrile, polymethylmethacrylate, polyvinylalcohol, carboxymethylcellulose (CMC), starch, hydroxypropylcellulose, regenerated cellulose, polyvinylpyrrolidone, tetrafluoroethylene, polyethylene, polypropylene, polyacrylic acid, ethylene-propylene-diene monomer, sulfonated ethylene-propylene-diene monomer, styrene butadiene rubber and fluororubber.

The content of the binder may be about 0.1 parts to 10 parts by weight relative to the total of 100 parts by weight of the negative electrode active layer, or may be, for example, about 0.1 parts to 8 parts by weight, 0.1 parts to 5 parts by weight, 0.1 parts to 3 parts by weight or 2 parts to 6 parts by weight. In the present disclosure, by controlling the content of the binder contained in the negative electrode active layer within the above range, it is possible to prevent the decrease of adhesion of the active layer, which is caused by a relatively low content of binder or to prevent the decrease of electrical properties of the electrode, which is caused by an excessive amount of binder.

Also, the negative electrode current collector is not particularly limited as long as it has high conductivity without causing chemical changes in the corresponding battery. For example, copper, stainless steel, nickel, titanium, calcined carbon, etc. may be used, and in the case of copper or stainless steel, those whose surfaces are treated with carbon, nickel, titanium, silver, etc. may also be used. In addition, the average thickness of the negative electrode current collector can be appropriately applied in a range of about 1 μm to 500 μm, in consideration of the conductivity and total thickness of the negative electrode to be manufactured.

Lithium Secondary Battery

Also, according to one embodiment of the present disclosure, a lithium secondary battery includes: a positive electrode, the above-mentioned negative electrode according to the present disclosure, and a separator disposed between the positive electrode and the negative electrode.

The lithium secondary battery according to the present disclosure includes an electrode assembly having a structure where the separator is disposed between the positive electrode and the above-mentioned negative electrode of the present disclosure, and has a structure in which the electrode assembly is inserted into a battery casing, and then is sealed after an electrolyte composition is injected.

The negative electrode has the same configuration as the configuration of the above-described negative electrode for the lithium secondary battery according to the present disclosure, and thus detailed descriptions thereof will be omitted.

Also, the positive electrode includes a positive electrode composite layer prepared by applying, drying and pressing a positive electrode active material-containing positive electrode slurry on a positive electrode current collector. The positive electrode composite layer may optionally further include a conductive material, a binder, other additives, etc. as necessary.

The positive electrode active material is a material capable of electrochemically causing a reaction on the positive electrode current collector, and may include one or more types among lithium metal oxides allowing lithium ions to be reversibly intercalated and deintercalated and represented by the following Formulas 2 and 3:

$LiFe_aM^1_{1-a}XO_4$ [Chemical Formula 2]

$Li_x[Ni_yCo_zMn^1_{1-a}M^2]O_2$ [Chemical Formula 3]

In the Formulas 2 and 3, $M^1$ is one or more types of elements selected from the group consisting of W, Cu, Fe, V, Cr, CO, Ni, Mn, Ti, Zr, Zn, Al, In, Ta, Y, La, Sr, Ga, Sc, Gd, Sm, Ca, Ce, Nb, Mg, B, and Mo, X is one or more types selected from the group consisting of P, Si, S, As and Sb, a satisfies $0 < a \leq 1.0$, $M^2$ is one or more types of elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w and v satisfy $1.0 \leq x \leq 1.30$, $0 \leq y < 1$, $0 \leq z \leq 1$, $0 \leq w \leq 1$, and $0 \leq v \leq 0.1$ respectively, and $y+z+w+v=1$.

The compounds represented by the Formulas 2 and 3 are lithium metal oxides that are applied as positive electrode active materials of lithium secondary batteries in the art. Among these, the lithium composite metal oxide represented by the Formula 3 is a ternary lithium oxide including nickel (Ni), cobalt (Co) and manganese (Mn) as main components. The lithium composite metal oxide has relatively high energy density and thus has an advantage of suitability for medium to large-sized secondary batteries in the transportation field for electric vehicles (EV), and the like, or the power storage such as energy storage systems (ESS), in terms of performance such as output.

Examples of the lithium metal oxide represented by the Formula 3 may include $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, and $LiNi_{0.7}Co_{0.1}Mn_{0.1}Al_{0.1}O_2$.

As the content of nickel (Ni) increases, the lithium composite metal oxide has an increased charging/discharging capacity, but exhibits a low chemical/structural stability. Thus, an exothermic reaction is likely to occur. This causes a problem that there is a high possibility of occurrence of ignition. In particular, the exothermic reaction may occur when a short-circuit current flows inside the battery. Thus, in the lithium secondary battery according to the present disclosure, a coating layer satisfying a predetermined volume resistance is introduced to the negative electrode. Then, an exothermic reaction is suppressed in the event of an internal short caused by a contact between a negative electrode surface and a positive electrode current collector (and/or a positive electrode active layer), while a significantly small amount of current is leaked, thereby preventing problems continuously occurring after the internal short. Therefore, there is an advantage of safety improvement over the conventional lithium secondary battery.

Meanwhile, examples of the compound represented by the formula 2 may include $LiFePO_4$, $LiFe_{0.5}Mn_{0.2}PO_4$, $LiFe_{0.7}Mn_{0.3}PO_4$, $LiFe_{0.5}Mn_{0.5}PO_4$.

Also, the content of the positive electrode active material may be about 85 parts by weight or more relative to the weight of the positive electrode active layer, or may be about 90 parts by weight or more, 93 parts by weight or more, or 95 parts by weight or more.

Further, the positive electrode active layer may further include a conductive material, a binder, other additives, etc. together with the positive electrode active material.

The conductive material is used for improving the electrical performance of the positive electrode, and those commonly used in the art may be applied. Examples thereof may include one or more types selected from the group consisting of natural graphite, artificial graphite, carbon black, acetylene black, denka black, ketjen black, super-P, channel black, furnace black, lamp black, thermal black, graphene and carbon nanotube.

Further, the content of the conductive material may be about 0.1 parts to 5 parts by weight relative to the weight of each positive electrode active layer, or may be about 0.1 parts to 4 parts by weight; 2 parts to 4 parts by weight; 1.5 parts to 5 parts by weight; 1 parts to 3 parts by weight; 0.1 parts to 2 parts by weight; or 0.1 parts to 1 parts by weight.

Also, the binder performs a role of binding the positive electrode active material, the positive electrode additive, and the conductive material to each other, and may be used without particular limitation as long as it has such a function. For example, the binder may include one or more types of resins selected from the group consisting of polyvinylidene fluoride-hexafluoropropylene copolymer (PVdF-co-HFP), polyvinylidene fluoride (PVdF), polyacrylonitrile, polymethylmethacrylate, and copolymers thereof. As an example, the binder may include polyvinylidene fluoride.

In addition, the content of the binder may be about 1 part to 10 parts by weight relative to the weight of each positive electrode active layer, and, for example, the content may be about 2 parts to 8 parts by weight; or 1 parts to 5 parts by weight.

The total thickness of the positive electrode active layer may be, for example, about 50 μm to 300 μm, or may be 100 μm to 200 μm; 80 μm to 150 μm; 120 μm to 170 μm; 150 μm to 300 μm; 200 μm to 300 μm; or 150 μm to 190 μm.

Also, in the positive electrode, as for the positive electrode current collector, those having high conductivity without causing chemical changes in the corresponding battery may be used. For example, stainless steel, aluminum, nickel, titanium, calcined carbon, etc. may be used, and in the case of aluminum or stainless steel, those whose surfaces are treated with carbon, nickel, titanium, silver, and the like, may also be used. In addition, the average thickness of the current collector can be appropriately applied in a range of about 3 μm to 500 μm in consideration of the conductivity and total thickness of the positive electrode to be manufactured.

Meanwhile, the separator interposed between the positive electrode and the negative electrode of each unit cell is an insulating thin film having high ion permeability and mechanical strength, and is not particularly limited as long as it is commonly used in the art. For example, it is possible to use those containing one or more types of chemical-resistant and hydrophobic polymers among polypropylene; polyethylene; and polyethylene-propylene copolymer. The separator may have a form of a porous polymer substrate such as a sheet or a non-woven fabric containing the above-mentioned polymer, or in some cases, may have a form of a composite separator in which organic or inorganic particles are coated with an organic binder on the porous polymer substrate. Also, the separator may have an average pore diameter of about 0.01 μm to 10 μm, and an average thickness of about 5 μm to 300 μm.

Meanwhile, the lithium secondary battery according to the present disclosure may be a secondary battery having a form that may include a stack-type, zigzag-type, or zigzag-stack-type electrode assembly in which the possibility of the contact between the positive electrode current collector (and/or the positive electrode active layer) and the negative electrode active layer is relatively high. As an example, the lithium secondary battery according to the present disclosure may be a pouch-type secondary battery or a prismatic secondary battery.

Lithium Secondary Battery System

Further, according to one embodiment of the present disclosure, a lithium secondary battery system includes: cell assemblies each including n (where n is an integer of 3 to 100) lithium secondary batteries according to the present disclosure; a charging/discharging unit electrically coupled to each of the cell assemblies to individually charge or discharge each of the cell assemblies; a sensing unit electrically coupled to an electrode of each lithium secondary battery included in the cell assemblies to individually measure at least one type of electricity amount between an electric voltage and an electric current of the secondary battery during charging/discharging of each lithium secondary battery; and a controller electrically coupled to the charging/discharging unit and the sensing unit to control charging or discharging of each of the cell assemblies. When the electricity amount measured by the sensing unit satisfies a predetermined value, the controller stops charging or discharging of a cell assembly including a corresponding lithium secondary battery.

FIG. 1 is a schematic diagram of a configuration of the lithium secondary battery system according to the present disclosure. Referring to FIG. 1, a lithium secondary battery system 10 according to the present disclosure includes: cell assemblies 110 each including n lithium secondary batteries 111 of the present disclosure as describe above (where n is an integer of 3 to 100); a charging/discharging unit 120 electrically coupled to each of the cell assemblies 110 to individually charge or discharge each of the cell assemblies; a sensing unit 130 electrically coupled to an electrode of each lithium secondary battery 111 included in the cell assemblies 110 to individually measure an electric voltage and/or an electric current of each secondary battery 111 during charging/discharging of the lithium secondary battery; and a controller 140 electrically coupled to the charging/discharging unit 120 and the sensing unit 130 to control charging or discharging of each of the cell assemblies 110.

The lithium secondary battery system 10 is configured to individually measure and monitor an electric voltage and/or an electric current of each of n lithium secondary batteries 111 constituting the cell assembly 110 during charging or discharging of the secondary batteries so as to determine an internal short of the secondary battery 111. Then, when the internal short is determined, the charging or discharging of only the cell assembly 110 including the corresponding lithium secondary battery 111 is immediately stopped.

For example, for a conventional secondary battery system, techniques have been developed in which a short-circuit inside a secondary battery is diagnosed by measuring a temperature change of the battery being charged and/or discharged or by using a state of charge (SOC) change caused by self-discharging in the event of an internal short. However, when an internal short of a secondary battery actually occurs, a thermal runaway progresses in a relatively short time due to a melt-down phenomenon. Thus, in the case of the above techniques, there is a limitation in that it is difficult to respond to the thermal runaway because the diagnosis accuracy is not sufficiently high or the diagnosis process is complicated, and then it takes a relatively long time to recognize the internal short.

However, the lithium secondary battery system 10 according to the present disclosure includes the above-mentioned lithium secondary battery 111 of the present disclosure, and the lithium secondary battery includes the negative electrode in which the coating layer having a predetermined volume resistance is provided on a negative electrode active layer surface. Thus, in the event of an internal short caused by a contact between the positive electrode current collector (or the positive electrode active layer) and the negative electrode surface, an appropriate insulation can be achieved on the negative electrode surface while a significantly low amount of leakage current is allowed to flow through the negative electrode. In the event of the internal short, in conventional lithium secondary batteries, the electric voltage and the electric current are close to 0V and 0 A, respectively, due to a leakage current. However, a predetermined electric current, which is an applied current remaining after a trace amount of leakage current is lost, flows through the lithium secondary battery 111 according to the present disclosure, and thus the leaked current can be used to detect and/or determine the internal short of the lithium secondary battery 111 with relatively high accuracy in a significantly short time. Also, in the lithium secondary battery 111, it is possible to significantly reduce heat generated by the internal short, such as short-circuit heat, thereby delaying the occurrence of a melt-down phenomenon. Furthermore, heat of the corresponding lithium secondary battery in which the internal short has occurred can be prevented from causing additional heat generation and/or melt-down phenomenon in adjacent lithium secondary batteries. Thus, it is possible to secure the response (or treatment) time for preventing thermal runaway of the corresponding lithium secondary battery in which the internal short has occurred.

For this, separately from the charging/discharging unit 120, the sensing unit 130 is electrically coupled to the lithium secondary battery 111, and can measure electrical properties flowing through a secondary battery electrode, especially, a negative electrode for each lithium secondary battery, in real time during charging or discharging of the lithium secondary battery 111. The 'electrical properties' are properties related to electricity flowing through the electrode of the lithium secondary battery, for example, the negative electrode, and may include an electric current, an electric voltage, and the like. The electrical properties measured in this way may be transmitted to the controller 140.

As an example, the sensing unit 130 may individually measure one or more types of an electric voltage and an electric current of each lithium secondary battery 111. In the lithium secondary battery system 10 according to the present disclosure, the above-mentioned lithium secondary battery 111 of the present disclosure is included in the cell assembly, so that even if the internal short occurs, insulation is implemented on the negative electrode surface and a predetermined electric current remaining after a relatively small amount of leakage current is lost is applied. Thus, through a change of at least one type of electricity amount between an electric current and an electric voltage, it is possible to individually quickly diagnose whether the internal short has occurred in the lithium secondary battery 111.

The sensing unit 130 may include measures commonly applied in the art to measure electrical properties flowing through each lithium secondary battery 111. For example, the sensing unit 130 may include, for example, a current measurement sensor for measuring an electric current or a voltage measurement sensor for measuring an electric voltage.

Also, the sensing unit 130 may further include a temperature measurement sensor (not illustrated) inside the cell assembly 110. The temperature measurement sensor is used to measure a temperature of each lithium secondary battery 111 provided in the cell assembly 110. The electric current of the lithium secondary battery may increase when the temperature of the secondary battery rises. The temperature rise of the secondary battery may be caused when an excessive current flows due to overload caused by fluctuations in the load connected to a system; inputting or opening of a transformer or a capacitor; or an operation of an electric motor or a motor. The sensing unit 130 may further include a temperature measurement sensor that measures the temperature of each lithium secondary battery 111 in order to reflect an electric current change caused by this temperature rise of the secondary battery in addition to the internal short of the lithium secondary battery. Accordingly, the error rate can be further lowered in determining the internal short.

Further, the controller 140 is electrically coupled to each of the charging/discharging unit 120 and the sensing unit 130. The controller 140 monitors electrical properties of each lithium secondary battery 111 in real time during charging and/or discharging of each cell assembly 110 while individually detecting and/or determining the internal short of the lithium secondary battery 111 through a change of electrical properties. Then, the controller 140 controls charging or discharging of the cell assembly 110 including the corresponding lithium secondary battery 111 in which the internal short has occurred.

As an example, the controller 140 monitors electrical properties of each lithium secondary battery 111 transmitted from the sensing unit 130 in real time. Then, when there is a change in the transmitted electrical properties, the controller 140 determines whether the amount of the change satisfies a predetermined value; and then individually controls charging or discharging of the cell assembly 110 including the corresponding lithium secondary battery 111 through the charging/discharging unit 120 when the predetermined value is satisfied.

For example, the controller 140 receives individual electricity amounts for all lithium secondary batteries 111 included in the lithium secondary battery system 10 from the sensing unit 130. Then, the electricity amount of each cell assembly 110 including these batteries and an average value of the electricity amounts of the plurality of cell assemblies 110, that is, an average electricity amount (A) of the cell assemblies 110, can be calculated from the individual transmitted electricity amounts of the lithium secondary batteries 111. The electricity amount may stand for an electric voltage and/or an electric current, on which a correction value based on the temperature of each lithium secondary battery may be reflected. The correction value is measured by the temperature measurement sensor of the sensing unit 130. Also, the average electricity amount (A) of the cell assemblies 110 may be an average electricity amount of all cell assemblies included in the lithium secondary battery system, and in some cases, may also be an average electricity amount of some cell assemblies among all cell assemblies.

By individually comparing the average electricity amount (A) of the cell assemblies 110 calculated in this way to the electricity amount of each cell assembly 110, it is possible to primarily select the cell assembly 110 whose error rate is about 5% or more, for example, about 7% or more; 10% or more; 5 to 20%; or 5 to 15%. The primary selection refers to a process of selecting a cell assembly including a lithium secondary battery recognized as one in which a problem has occurred, among all lithium secondary batteries. The primary selection can shorten the time required to monitor an applied electricity amount preset for charging/discharging for all lithium secondary batteries and an electricity amount of an individual lithium secondary battery, thereby providing quickness in determining the internal short of the lithium secondary battery system.

Also, in n lithium secondary batteries included in each cell assembly, a voltage difference may occur between cells during charging/discharging. This voltage difference between cells may be caused by a manufacturing process of each lithium secondary battery or external factors. The voltage difference between cells may affect the capacity and lifespan of the lithium secondary battery, and may cause overcharging and/or overdischarging of individual lithium secondary batteries. Thus, cell balancing may be performed to prevent this. The cell balancing can be performed by applying a micro-current to a circuit structure applied to the lithium secondary battery system. In this case, a deviation in the electricity amount can be induced between the lithium secondary batteries. Thus, by setting the error rate between the average electricity amount (A) and the electricity amount of each lithium secondary battery to about 5% or more, it is possible to further increase the accuracy in determining the internal short.

Next, when the electricity amount of the individual lithium secondary battery is lower than the applied electricity amount preset for charging or discharging for the lithium secondary batteries 111 included in the primarily selected cell assembly 110, by 0.5% or more, the controller 140 may determine the internal short of the corresponding lithium secondary battery.

In general, when the internal short occurs in the lithium secondary battery, since a leakage current is generated at the short-circuit point, the measured electric current and electric voltage may be close to 0 A and 0V, respectively. However, in the lithium secondary battery system according to the present disclosure, due to the coating layer of the negative electrode provided in the secondary battery, not only predetermined insulation can be achieved on the negative electrode surface, but also a predetermined amount of current can flow in the event of the internal short. The current is an applied current remaining after a very small amount of current leaked at the internally short-circuited point is lost, and thus may be lower than the applied current amount preset for charging or discharging of the lithium secondary batteries. This deviation between the preset applied current amount and the electric current amount may be about 0.5% or more of the preset applied current amount, and may be, for example, about 0.5% or more; 1% or more; 2% or more; 3% or more; 5% or more; 10% or more; 15% or more; 20% or more; 30% or more; 50% or more; 70% or more; 5 to 90%; 5 to 50%; 10 to 30%; 50 to 90%; 0.5 to 20%; 0.5 to 10%; 0.5 to 5%; 0.5 to 3%; 5 to 10%; or 0.5 to 20%.

The controller 140 may send a charging or discharging stop signal, to the charging/discharging unit 120 so as to stop charging or discharging of the cell assembly 110 including the corresponding lithium secondary battery 111 determined to be internally short-circuited and then to stop charging or discharging for the corresponding lithium secondary battery 111. When the charging or discharging stop signal is received from the controller 140, the charging/discharging unit 120 may selectively stop charging or discharging for the cell assembly 110 including the corresponding lithium secondary battery 111. In the present disclosure, when the internal short occurs in the lithium secondary battery, charging or discharging is controlled on a cell assembly basis. Thus, as compared to when a response to the internal short is performed on a basis of the lithium secondary battery, not only a response time can be further reduced, but also the maintenance efficiency can be increased during a normal use of the lithium secondary battery system.

Meanwhile, the cell assembly 110 may include two or more lithium secondary batteries 111 of the present disclosure, or may include, for example, 2 to 100; 2 to 50; 2 to 30; 5 to 20; 3 to 5; 5 to 20; or 10 to 20 lithium secondary batteries 111.

These lithium secondary batteries 111 can be electrically connected in series, parallel or a series-parallel mixed form.

As an example, n lithium secondary batteries may be connected in parallel and mounted inside the cell assembly. The lithium secondary battery system according to the present disclosure controls charging/discharging on a cell assembly basis during the internal short. However, as described above, when n lithium secondary batteries provided inside the cell assembly are electrically connected in parallel, there is an advantage in that among n lithium secondary batteries, charging/discharging of the corresponding lithium secondary battery in which the internal short has occurred can be individually additionally controlled.

There is an advantage in that when an internal short occurs in any lithium secondary battery, charging or discharging of each lithium secondary battery can be controlled.

Further, the cell assembly 110 may be a battery module or a battery bank depending on the number of lithium secondary batteries included inside the cell assembly 110, or the shape and/or type of the housing including these. Also, when a plurality of such cell assemblies 110 is included (150), the plurality of cell assemblies may mean a battery pack or an energy storage system.

Also, the charging/discharging unit 120 is electrically coupled individually to the cell assemblies 110 and has a function of charging or discharging each cell assembly 110. For this, the charging/discharging unit 120 may be electrically coupled individually to an external power source PS for charging the cell assembly 110 and an electric load EL for using power stored in the cell assembly 110.

The types of the external power source PS and the electric load EL are not particularly limited as long as they correspond to methods commonly applied to products to which the lithium secondary battery system 10 is applied.

As an example, the external power source PS is a means that can supply constant-current or constant-voltage charging power to each of the cell assemblies 110. When the lithium secondary battery system 10 is applied to an electric vehicle (EV), the external power source PS may include a charging station for the electric vehicle (EV), and in some cases, may include a separate power source or an auxiliary battery included within the electric vehicle (EV).

Also, the electric load EL is a means that uses power stored in the cell assembly 110 and discharges the lithium secondary batteries 111 provided in the cell assembly 110. When the lithium secondary battery system 10 is applied to the electric vehicle (EV), the electric load EL may be, for example, an inverter or an electric motor applied to the electric vehicle (EV). The inverter may perform a function of converting direct current provided from the cell assembly 110 included in the lithium secondary battery system 10, into alternating current. The electric motor may be driven using alternating power provided from the inverter.

Also, the lithium secondary battery system 10 according to the present disclosure may further include an input/output unit (not illustrated) through which charging/discharging conditions can be input to the controller 140, and the user can check the results determined by the controller 140.

The lithium secondary battery system 10 may change the condition of an applied voltage or an applied current during charging and/or discharging, according to the type of the electric load EL electrically coupled to the charging/discharging unit 120 or the usage environment. In order to input this changed charging/discharging conditions to the controller 140, the input/output unit may include user input means commonly applied in the art, such as a keyboard, a mouse, a barcode recognizer, a voice recognizer, and a touch screen.

Also, in a case where the controller 140 determines that an internal short has occurred in the cell assembly 110, in order to inform the user of, for example, whether the internal short has occurred; the occurrence time; and the location of the corresponding lithium secondary battery 111 and/or the corresponding cell assembly 110 determined to be internally short-circuited, the input/output unit may include, for example, output means commonly applied in the art, such as a display device (e.g., a monitor or a touch screen) and an audio output device.

Figure 2:
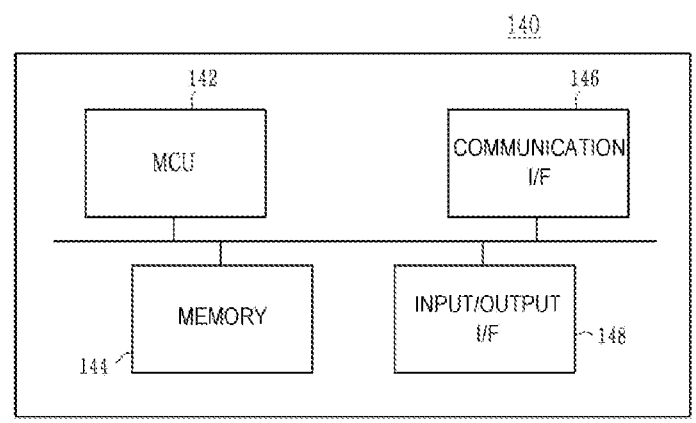
FIG. 2 is a block diagram illustrating a hardware configuration in which a control device included in the lithium secondary battery system according to the present disclosure is implemented.

FIG. 2 is a block diagram illustrating a hardware configuration in which the control device 140 included in the lithium secondary battery system according to the present disclosure is implemented.

The control device 140 according to one embodiment disclosed in the present document may include a MCU 142, a memory 144, a communication L/F 146, and an input/output L/F 148. The MCU 142 is a micro controller unit and is a processor that executes various programs stored in the memory 144, processes various data to be used in these programs, and performs functions of the control device 140.

The memory 144 may store operation data of various programs related to the operation of the lithium secondary battery system so as to operate the control device 140. A plurality of such memories 144 may be provided as necessary. The memory 144 may be a volatile memory or a non-volatile memory. As for the volatile memory for the memory 144, a RAM, a DRAM, a SRAM, etc. may be used. As for the non-volatile memory for the memory 144, a ROM, a PROM, an EAROM, an EPROM, an EEPROM, a flash memory, etc. may be used. The examples of the memories 144 listed above are merely examples and the present disclosure is not limited thereto.

The communication I/F 146 is configured to transmit/receive various data to/from a server, and may be various devices that can support wired or wireless communication. For example, through the communication I/F 146, programs or various data for operating the control device 140 can be transmitted/received by wire or wirelessly to/from a separately prepared external server. The input/output IF 148 may provide an interface that connects an input device (not illustrated) such as a keyboard, a mouse, or a touch panel and an output device such as a display (not illustrated) to the MCU 142 to allow data to be transmitted and received.

Further, the lithium secondary battery system 10 according to the present disclosure has the above-mentioned configuration and then has excellent safety against an internal short, and thus can be used as a power source for medium to large-sized devices that require, for example, high energy density and high safety against an internal short. Examples of these medium to large-sized devices may include: a power tool powered and driven by an electric motor; electric cars including an electric vehicle (EV), a hybrid electric vehicle (HEV), a plug-in hybrid electric vehicle (PHEV), etc.; electric two-wheeled vehicles including an electric bicycle (E-bike), and an electric scooter (Escooter); an electric golf cart; and a power storage system (ESS), and a hybrid electric vehicle (HEV) may be further exemplified.

Meanwhile, electronic or electric devices and/or any other related devices or components described in the present specification may be implemented using any suitable hardware, firmware (e.g., application-specific integrated circuit), software, or a combination of software, firmware and hardware. For example, various components of these devices may be formed on one integrated circuit (IC) chip or on an individual IC chip. Also, various components of these devices may be implemented on a flexible printed circuit film, a tape carrier package (TCP), a printed circuit board (PCB) or one substrate. Electrical connections or interconnections described in the present specification may be implemented by, for example, wiring or conductive elements on a PCB or other types of circuit carriers. The conductive element may include, for example, metalizations such as surface metalizations, and/or pins, and may include conductive polymers or ceramics. Also, the electric energy may be transmitted via, for example, wireless connections using electromagnetic radiation or light.

Also, various components of these devices may be processes or threads executed on one or more processors within one or more computing devices, that execute computer program instructions and interact with other system components so as to perform various functions described herein. The computer program instructions are stored in the memory that may be implemented in a computing device using a standard memory device, such as, for example, a random access memory (RAM). The computer program instructions may also be stored in other non-transitory computer readable media, such as, for example, a CD-ROM, and a flash drive.

In addition, those skilled in the art would recognize that functions of various computing devices can be combined with or integrated into a single computing device, or functions of a particular computing device can be distributed across one or more other computing devices without departing from the scope of exemplary embodiments of the present disclosure.

Since the lithium secondary battery system according to the present disclosure has the above-mentioned configuration, a predetermined electric current can be applied in the event of an internal short. Thus, charging and/or discharging can be preemptively controlled before thermal runaway occurs in a corresponding lithium secondary battery in which the short has occurred. Also, since it is possible to prevent additional melt-down phenomenon and/or thermal runaway from occurring in adjacent lithium secondary batteries, the lithium secondary battery system can be usefully applied to, for example, a battery module or a battery pack where a plurality of lithium secondary batteries is applied.

Hereinafter, the present disclosure will be described in more detail with reference to Examples and Experimental Examples.

Meanwhile, the following Examples and Experimental Examples are merely illustrative of the present disclosure, and the contents of the present disclosure are not limited to the following Examples and Experimental Examples.

Examples 1 to 8 and Comparative Examples 1 to 8. Manufacturing of Lithium Secondary Battery Manufacturing of Positive Electrode $LiNi_{0.8}Co_{0.1}Mn_{0.1}O_2$ with a particle size of 5 μm was prepared as a positive electrode active material, and then mixed with a carbon-based conductive material and polyvinylidene fluoride as a binder at a weight ratio of 94:3:3 in N-methyl pyrrolidone (NMP) to form a slurry. The slurry was cast on a thin aluminum plate, dried in a vacuum oven of 120° C., and rolled to prepare a positive electrode.

Manufacturing of Negative Electrode

Mixed graphite obtained by mixing natural graphite (average particle size: 10±1 μm) and artificial graphite (average particle size: 8±1 μm) at a weight ratio of 2:8 was prepared as a negative electrode active material, and carbon black as a conductive material and carboxymethylcellulose (CMC) and styrene butadiene rubber (SBR) as a binder were prepared. Then, 95 parts by weight of mixed graphite, 1 part by weight of carbon black, 1.5 parts by weight of carboxymethylcellulose (CMC) and 2.5 parts by weight of styrene butadiene rubber (SBR) were mixed with water to have a solid content of 50%, so that a negative electrode slurry was prepared.

Separately, boehmite (average particle size ($D_{50}$): 200 nm to 400 nm) as aluminum-containing particles and citric acid as a first dispersant were added to water, mixed for 10 min, and dispersed. Then, ethylene diamine as a second dispersant was added to the prepared dispersion and was dispersed. Finally, silicon-containing particles were added to the dispersion and mixed for 20 to 30 min to prepare a coating slurry. Here, i) the content of each component included in the coating slurry; ii) the type of silicon-containing particles; and iii) the particle size ($D_{50}$) of silicon-containing particles were adjusted as presented in Table 1 below.

When the negative electrode slurry and the coating slurry were separately prepared, the slurries were simultaneously cast on a copper thin plate (thickness: 10 μm) being roll-toroll transferred (transfer rate: 5 m/min), by using a dual die coater. The negative electrode slurry and the coating slurry were cast such that average thicknesses became about 100 μm to 200 μm and 5 μm to 20 μm, respectively, along the transfer direction of the copper thin plate. The copper thin plate on which the slurries were simultaneously cast was dried in a vacuum oven of 120° C. and was rolled to prepare a negative electrode (thickness ratio of coating layer to negative electrode active layer: about 0.17). A volume resistance was measured on the prepared negative electrode. The measurement results are presented in Table 1.

Manufacturing of Lithium Secondary Battery

A separator made of polypropylene with a thickness of about 18 μm was disposed between the previously prepared positive electrode and the negative electrode, and was inserted into a pouch-type casing, and then an electrolyte composition was injected. Thus, a 1 Ah-class lithium secondary battery was assembled.

sensing unit 130 were individually electrically connected in parallel to a positive electrode 111a and a negative electrode 111b of each lithium secondary battery provided in the cell assembly. The charging/discharging unit 120 used herein was provided with a separate port to which the external power source PS and the electric load EL can be electrically connected. The sensing unit 130 used herein was provided with a current measurement sensor for measuring an electric current of the negative electrode 111b and a temperature measurement sensor for measuring the surface temperature of each lithium secondary battery.

Also, the charging/discharging unit 120 and the sensing unit 130 were electrically connected individually to the controller 140, and the controller 140 used herein was provided with a touch screen. Through the touch screen, voltage and current conditions were input during charging and/or discharging of each lithium secondary battery provided in the cell assembly 110, and then, for example,

TABLE 1

|  | Content [% by weight] | | | | | Si containing particles | | Volume resistance [Ω · cm] of negative electrode |
| --- | --- | --- | --- | --- | --- | --- | --- | --- |
|  | Si containing particles | Al containing particles | First dispersant | Second dispersant | Type | Particle size (D$_{50}$) [μm] | Presence of carbon coating | |
| Comp. Example 1 | — | — | — | — | — | — | — | 3.346 × 10$^{-4}$ |
| Comp. Example 2 | 30 | — | 35 | 35 | SiO | 5.0 ± 0.2 | X | 1.119 × 10$^{-1}$ |
| Comp. Example 3 | — | 70 | 15 | 15 | SiO | 5.0 ± 0.2 | X | >1 |
| Comp. Example 4 | 14 | 57 | 14.5 | 14.5 | Si | 5.0 ± 0.2 | X | 0.121 × 10$^{-4}$ |
| Comp. Example 5 | 14 | 57 | 14.5 | 14.5 | SiO$_2$ | 5.0 ± 0.2 | X | >1 |
| Comp. Example 6 | 7 | 64 | 14.5 | 14.5 | SiO | 5.0 ± 0.2 | X | 1.923 × 10$^{-3}$ |
| Comp. Example 7 | 14 | 57 | 14.5 | 14.5 | SiO | 1.5 ± 0.05 | X | 2.974 × 10$^{-4}$ |
| Example 1 | 14 | 57 | 14.5 | 14.5 | SiO | 2.0 ± 0.2 | X | 7.418 × 10$^{-2}$ |
| Example 2 | 14 | 57 | 14.5 | 14.5 | SiO | 5.0 ± 0.2 | X | 1.054 × 10$^{-1}$ |
| Example 3 | 14 | 57 | 14.5 | 14.5 | SiO | 16.0 ± 0.2 | X | 3.823 × 10$^{-1}$ |
| Example 4 | 14 | 57 | 14.5 | 14.5 | SiO | 5.0 ± 0.2 | ○ | 6.937 × 10$^{-2}$ |
| Example 5 | 26 | 58 | 8 | 8 | SiO | 5.0 ± 0.2 | X | 4.284 × 10$^{-1}$ |
| Example 6 | 8 | 76 | 8 | 8 | SiO | 5.0 ± 0.2 | X | 8.358 × 10$^{-2}$ |
| Example 7 | 14 | 57 | 29 | — | SiO | 5.0 ± 0.2 | X | 9.637 × 10$^{-1}$ |
| Example 8 | 14 | 57 | — | 29 | SiO | 5.0 ± 0.2 | X | >1 |

Comparative Example 8. Manufacturing of Lithium Secondary Battery

A lithium secondary battery was manufactured by performing the same method as in Example 2, except that in manufacturing of a negative electrode, a negative electrode active layer and a coating layer were formed such that a thickness ratio of the coating layer (average thickness: about 1.5 μm) to the negative electrode active layer became about 0.02. Here, the volume resistance of the negative electrode was about 2.397×10-4 Ω·cm.

Examples 9 to 16 and Comparative Examples 9 to 16. Manufacturing of Lithium Secondary Battery System A lithium secondary battery system having the configuration illustrated in FIG. 1 was manufactured by using each of the lithium secondary batteries manufactured in Examples 1 to 8 and Comparative Examples 1 to 8.

For example, 10 lithium secondary batteries manufactured in each of Examples 1 to 8 and Comparative Examples 1 to 8 were prepared, and the prepared five lithium secondary batteries were placed in a battery thickness direction and then were fixed, so that two cell assemblies 110 were manufactured. The charging/discharging unit 120 and the whether an internal short has occurred during charging/discharging; the internal short occurrence time; and the location of the corresponding lithium secondary battery 111 determined to be internally short-circuited among lithium secondary batteries of the cell assembly were output.

The external power source PS and the electric load EL were connected to each port of the charging/discharging unit 120, and charging/discharging of the cell assembly was performed. In the process of the charging/discharging progress of the cell assembly, it was confirmed that the sensing unit 130 measures an electric current flowing through the negative electrode of each lithium secondary battery, and a surface temperature of the lithium secondary battery in real time and transmits the electric current and the surface temperature to the controller 140. Then, the surface of any lithium secondary battery 111 among the lithium secondary batteries 111 provided in the cell assembly 110 was pressed so that an internal short was induced in the corresponding lithium secondary battery 111.

When the internal short occurred in the lithium secondary battery 111, the sensing unit 130 measured an electric current and a surface temperature of each lithium secondary battery provided in the cell assembly 110 and transmitted the measured electric current value and the surface temperature of the lithium secondary battery, to the controller 140. The controller 140 calculated the average value of the transmitted electric currents, and reflected correction values based on the measured temperatures of the lithium secondary batteries, on the calculated average value to obtain an electric current average value (A).

The controller 140 compared the electric current average value (A) calculated in this manner to the transmitted electric current values of the lithium secondary batteries and primarily selected lithium secondary batteries with an error rate of about 5% to 10%. Then, the controller 140 diagnosed that an internal short occurred in a lithium secondary battery whose electric current amount was lower than the applied current preset for charging or discharging for the selected lithium secondary batteries, by about 0.5% to 5%. Also, the controller 140 sent an electric signal to the charging/discharging unit 120 so as to stop charging/discharging of the cell assembly 110 including the lithium secondary battery diagnosed to be internally short-circuited, and thus, the charging/discharging of the corresponding cell assembly 110 was stopped. In this regard, in the lithium secondary battery systems of Examples, charging/discharging of the cell assembly was stopped before ignition occurred in the corresponding lithium secondary battery whereas in the lithium secondary battery systems of Comparative Examples, ignition occurred in the corresponding lithium secondary battery before charging/discharging of the cell assembly was stopped.

Next, the controller 140 transmitted, to the input/output unit, e.g., the touch screen, whether an internal short has occurred during charging/discharging; the internal short occurrence time; and the location of the corresponding lithium secondary battery 111 determined to be internally short-circuited among lithium secondary batteries of the cell assembly, and the input/output unit output the transmitted items to the touch screen.

Experimental Example 1

The following experiments were performed to evaluate the performance of the lithium secondary battery system according to the present disclosure in the event of an internal short.

Figure 3:
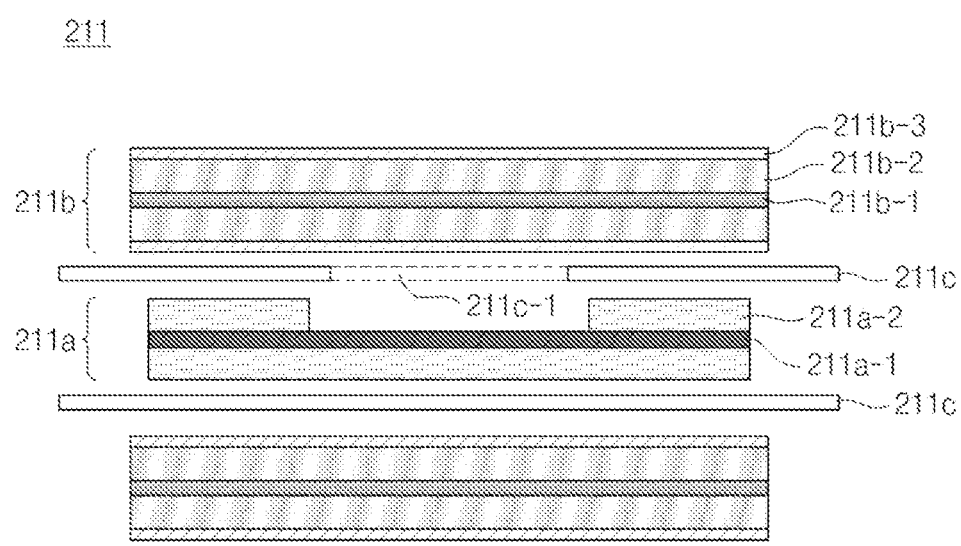
FIG. 3 is a cross-sectional view illustrating an electrode assembly structure of a lithium secondary battery manufactured in Experimental Example for a safety test of the lithium secondary battery according to the present disclosure.

FIG. 3 illustrates an electrode assembly structure of a lithium secondary battery according to an embodiment of the present disclosure including, for example, a positive electrode 211a, a negative electrode 211b, and a separator 211c. The positive electrode 211a includes a positive electrode current collector 211a-1 and a positive electrode active layer 211a-2. The negative electrode 211b includes a negative electrode current collector 211b-1, a negative electrode active layer 211b-2, and a coating layer 211b-3. For example, as illustrated in FIG. 3, 1 Ah-class pouch-type lithium secondary batteries 211 (N/P ratio=about 1.07) for experiments were manufactured by performing the same methods as in Examples 1 to 8 and Comparative Examples 1 to 8 except that the separator 211c having a hollow central portion 211c-1 was used, and the positive electrode 211a having a central portion on which no positive electrode active layer 211a-2 was formed was used such that the positive electrode current collector 211a-1 meets the negative electrode active layer 211b-2 at the hollow portion 211c-1 of the separator 211c.

Each of the manufactured lithium secondary batteries was fully charged, and the central portion of the pouch-type lithium secondary battery was pressed to 1 MPa to induce an internal short. Then, the electric voltage of the lithium secondary battery and the surface temperature of the lithium secondary battery were measured for 100 sec. The internal short induction experiment was repeatedly performed three times in total.

Figure 4:
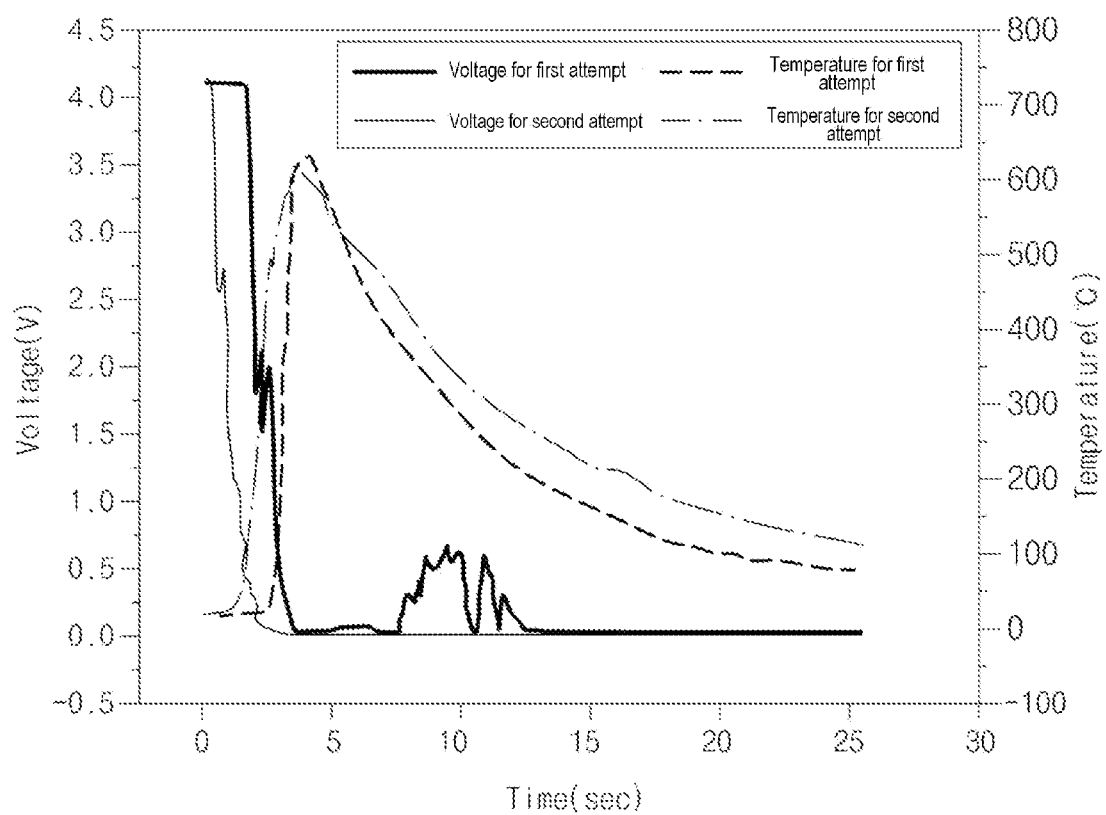
FIGS. 4 and 5 are graphs illustrating changes of battery temperatures and voltages at negative electrodes provided in lithium secondary batteries of Comparative Example 1 and Comparative Example 5, respectively, in the event of an internal short caused by a contact between a positive electrode current collector and a negative electrode surface.
Figure 5:
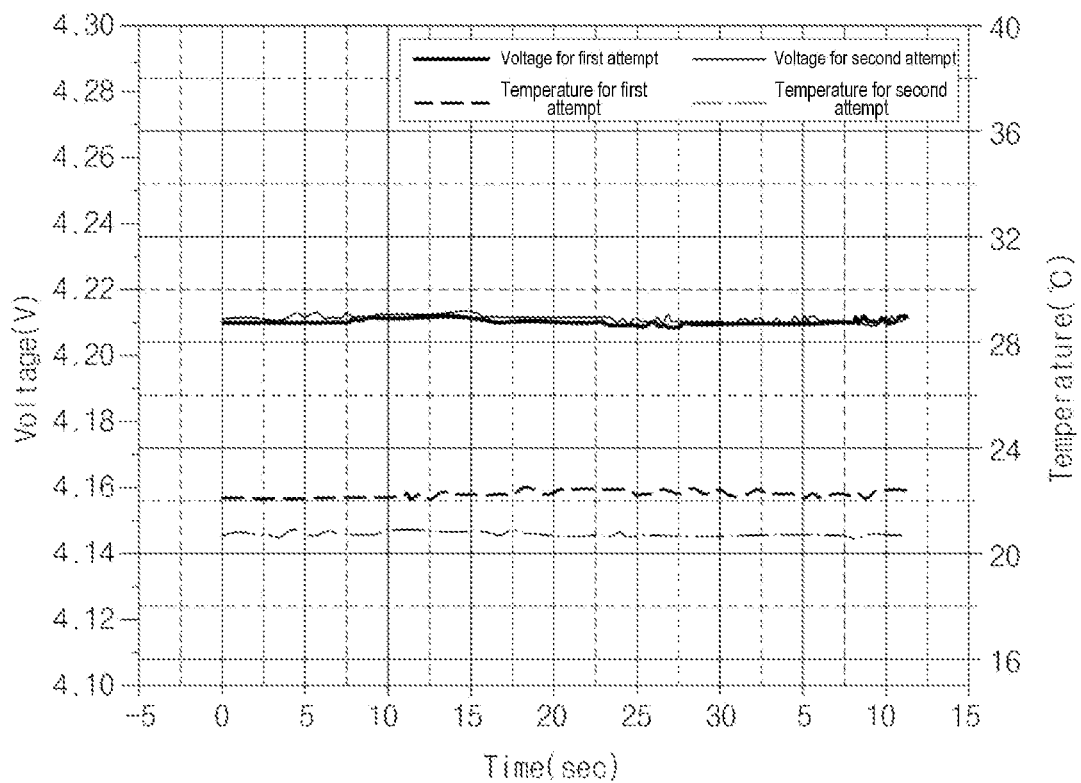
Figure 6:
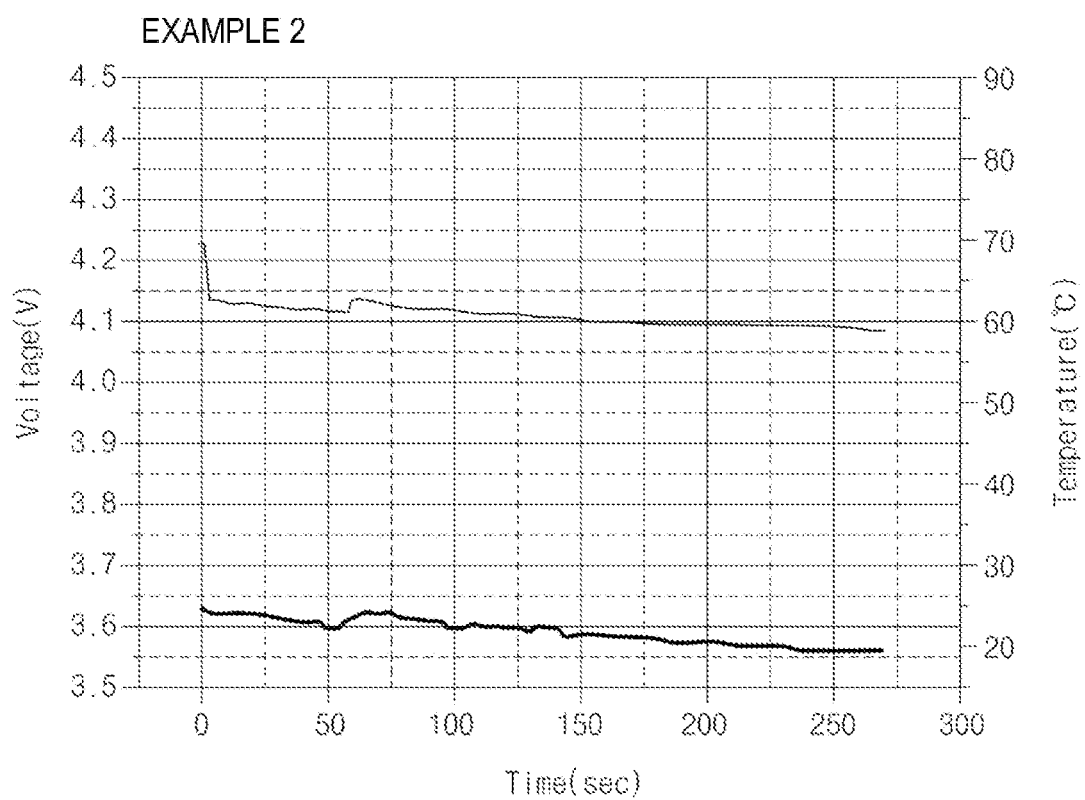
FIG. 6 is a graph illustrating changes of a battery temperature and a voltage at negative electrode provided in a lithium secondary battery of Example 2, in the event of an internal short caused by a contact between a positive electrode current collector and a negative electrode surface.

At the time of 100 sec. after the internal short, the electric voltage of the lithium secondary battery and the surface temperature of the lithium secondary battery were measured and average values thereof were calculated. Then, after the induction of the internal short, whether ignition occurred in the lithium secondary battery, and the time it took for the battery temperature to reach the maximum value were checked. The results are presented in Table 2 below. Also, in Example 2, Comparative Example 1 and Comparative Example 5, voltage and temperature changes according to the elapsed time are illustrated in FIGS. 4 to 6.

Separately, as in the manufacturing of Example 9, the lithium secondary battery system was manufactured by using cell assemblies. The cell assemblies included one 1 Ah-class pouch-type lithium secondary battery for the experiment, which was manufactured in advance, and nine pouch-type lithium secondary batteries manufactured in each of Examples 1 to 8 and Comparative Examples 1 to 8. While charging/discharging of the manufactured lithium secondary battery system was performed, an internal short was induced in the lithium secondary battery for the experiment. Here, the applied voltage during charging/discharging of the system was adjusted to about 4.2V.

Then, it was checked whether the lithium secondary battery system diagnosed that the lithium secondary battery for the experiment was internally short-circuited and determined the location of the internally short-circuited lithium secondary battery. The results are presented in Table 2 below.

TABLE 2

| | Internal short induction test of lithium secondary battery | | | | whether internal short was determined by system |
|---|---|---|---|---|---|
| | Average electric voltage [V] | Average temperature | time taken to reach maximum temperature | Ignition or not | |
| Example 1 | 3.90 ± 0.05 | 28 to 35° C. | greater than 60 sec | No ignition | ○ |
| Example 2 | 4.00 ± 0.10 | 17 to 22° C. | greater than 60 sec | No ignition | ○ |
| Example 3 | 4.10 ± 0.05 | 23 to 28° C. | greater than 60 sec | No ignition | ○ |
| Example 4 | 3.70 ± 0.10 | 30 to 50° C. | about 50 sec | No ignition | ○ |
| Example 5 | 4.10 ± 0.05 | 30 to 45° C. | Greater than 60 sec | No ignition | ○ |
| Example 6 | 4.00 ± 0.10 | 30 to 50° C. | about 60 sec | No ignition | ○ |

TABLE 2-continued

| | Internal short induction test of lithium secondary battery | | | | whether internal short was determined by system |
|---|---|---|---|---|---|
| | Average electric voltage [V] | Average temperature | time taken to reach maximum temperature | Ignition or not | |
| Example 7 | 3.50 ± 0.10 | 40 to 55° C. | about 45 sec | No ignition | ○ |
| Example 8 | 3.40 ± 0.10 | 45 to 60° C. | about 40 sec | No ignition | ○ |
| Comp. Example 1 | 0 | 640 to 645° C. | about 5 sec | ignition | X |
| Comp. Example 2 | 4.15 ± 0.05 | 70 to 90° C. | about 45 sec | No ignition | X |
| Comp. Example 3 | 4.21 ± 0.05 | 40 to 60° C. | about 60 sec | No ignition | X |
| Comp. Example 4 | 0 | 580 to 610° C. | about 6.5 sec | ignition | X |
| Comp. Example 5 | 4.22 ± 0.05 | 22 to 24° C. | — | No ignition | X |
| Comp. Example 6 | 0 | 550 to 580° C. | about 10 sec | ignition | X |
| Comp. Example 7 | 0 | 580 to 610° C. | about 7 sec | ignition | X |
| Comp. Example 8 | 0 | 580 to 610° C. | about 7 sec | ignition | X |

FIG. 4 is a graph illustrating changes of a voltage at the negative electrode and a battery temperature, in the lithium secondary battery of Comparative Example 1, in which the coating layer of the present disclosure is not applied to the negative electrode surface, in the event of an internal short caused by a contact between the positive electrode current collector and the negative electrode surface. In the case of Comparative Example 1, it can be seen that the voltage is rapidly changed, and thus a high current is generated, so that the temperature rapidly rises and ignition may be caused around, for example, 5 sec.

In addition, FIG. 5 is a graph illustrating changes of a battery temperature and a voltage at the negative electrode provided in the lithium secondary battery of Comparative Example 5, in the event of an internal short caused by a contact between the positive electrode current collector and the negative electrode surface. The case of Comparative Example 5 corresponds to a case where a insulation material (for example, $SiO_2$) is coated on the negative electrode surface, and it can be seen that there is almost no change in voltage over time and as a result, for example, no current flows even at compression of 1 mPa and also, there is almost no change in temperature. In this case, ignition does not occur, but there is a problem that abnormalities in the cell cannot be detected due to no change in the temperature.

FIG. 6 is a graph illustrating changes of a battery temperature and a voltage at the negative electrode provided in the lithium secondary battery of Example 2 to which the present disclosure is applied, in the event of an internal short caused by a contact between the positive electrode current collector and the negative electrode surface. As illustrated in FIG. 6, the upper voltage graph illustrates a minor voltage change over time, and as a result, in this case, a minute current is generated to some extent. The lower temperature graph illustrates a minor change in a range where ignition is not caused. That is, in the case of Example 2, it can be seen that it is possible to quickly detect the internal short by helping current flow slightly in the event of the internal short.

As illustrated in Table 2 and FIGS. 4 to 6 as above, since the lithium secondary battery of Example according to the present disclosure includes the coating layer having a predetermined volume resistance, on the negative electrode surface, it was found out that insulation is achieved in the event of the internal short of the lithium secondary battery, and at the same time, a small amount of leakage current is induced. Then, the lithium secondary battery has an electric voltage of 3.0 V or more, which is lower than the applied voltage, 4.2 V. Also, it was found out that in the lithium secondary batteries of the Examples, a leakage current is significantly low and the battery temperature is maintained at 60° C. or less. Further, it was found out that the lithium secondary battery system including such a lithium secondary battery can diagnose whether the lithium secondary battery is internally short-circuited by using a small amount of leakage current applied after the internal short, and also accurately determine the corresponding location.

In contrast, it was found out that in the lithium secondary batteries of Comparative Examples 1, 4, 6, 7 and 8, in which the coating layer is not provided or the volume resistance of the coating layer is significantly low, the temperature rapidly rises in a few seconds and ignition occurs in the event of the internal short. Also, due to the rapid thermal runaway, it was found out that the lithium secondary battery system including the lithium secondary battery of Comparative Example cannot determine whether the battery is internally short-circuited.

Also, in the lithium secondary batteries of Comparative Examples 3 and 5 in which the volume resistance of the coating layer exceeds about 1 Ω·cm, it was found out that insulation is completely achieved, and a current leakage or a temperature rise does not occur in the event of the internal short. Further, in the lithium secondary battery systems including the above lithium secondary batteries of Comparative Examples, it was found out that in the event of the internal short of the secondary battery, it is not possible to determine i) whether the battery is internally short-circuited and ii) the location of the internally short-circuited lithium secondary battery.

From these results, it can be found out that it is possible to achieve a predetermined volume resistance because the negative electrode for the lithium secondary battery according to the present disclosure includes silicon-containing particles and aluminum-containing particles of specific components. Also, in the lithium secondary battery including the negative electrode of the present disclosure, it is possible to achieve appropriate insulation on the negative electrode surface and to leak a predetermined current in the event of the internal short, and thus it can be found out that it is possible to prevent melt-down phenomenon and/or rapid heat generation of the lithium secondary battery in the event of the internal short and to secure the time to respond to the internal short.

Furthermore, it can be found out that the lithium secondary battery system including the lithium secondary battery uses the applied electric current in the event of the internal short so as to quickly determine whether the lithium secondary battery is internally short-circuited and the location of the internally short-circuited lithium secondary battery, with relatively high accuracy and speed.

Experimental Example 2

The following experiments were performed to evaluate the charging/discharging performance of the lithium secondary battery system according to the present disclosure.

For example, the lithium secondary batteries manufactured in Example 5, Example 6, and Comparative Example 1 were activated by being charged under CC-CV conditions up to 4.2 V at a rate of 0.3 C at 25° C., and being discharged under CC conditions up to 2.5 V at a rate of 0.3 C.

Then, the activated lithium secondary batteries were charged/discharged 400 times while the charging/discharging capacity and the coulombic efficiency were measured on the lithium secondary batteries. Here, the charging was performed under CC-CV conditions up to 4.25 V at 0.33 C-rate at 25° C., and the discharging was performed under CC conditions up to 3.0 V at 0.5 C-rate. The measurement results are illustrated in FIGS. 7 and 8.

Figure 7:
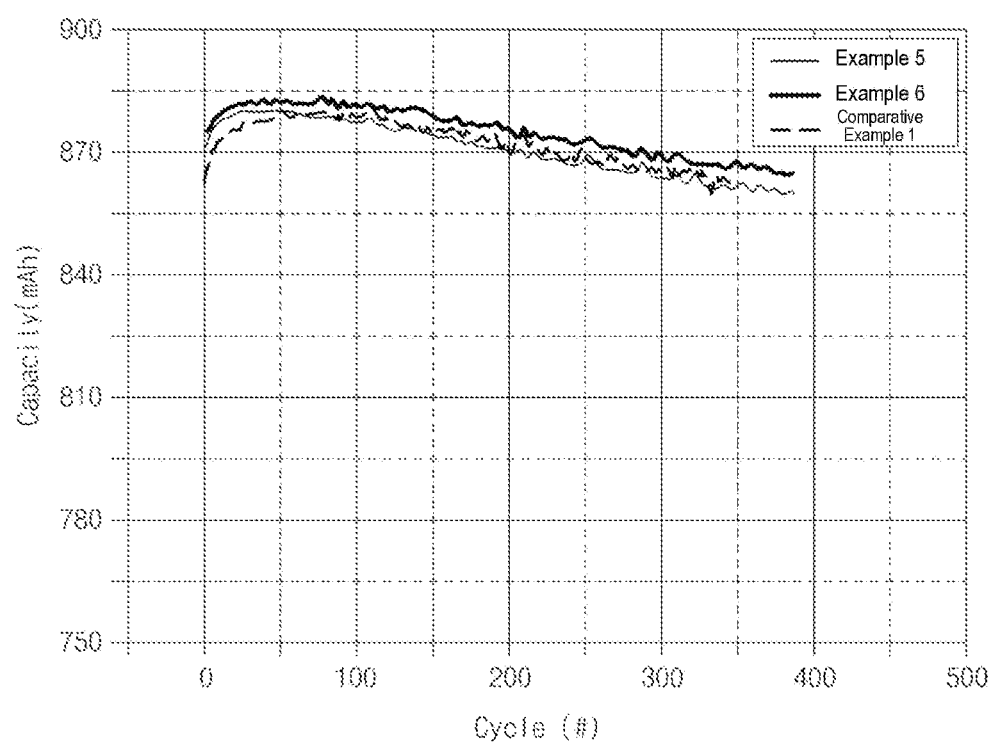
FIG. 7 is a graph illustrating a charging/discharging capacity change when lithium secondary batteries of Examples 5 and 6 and Comparative Example 1 are charged/discharged 400 times.
Figure 8:
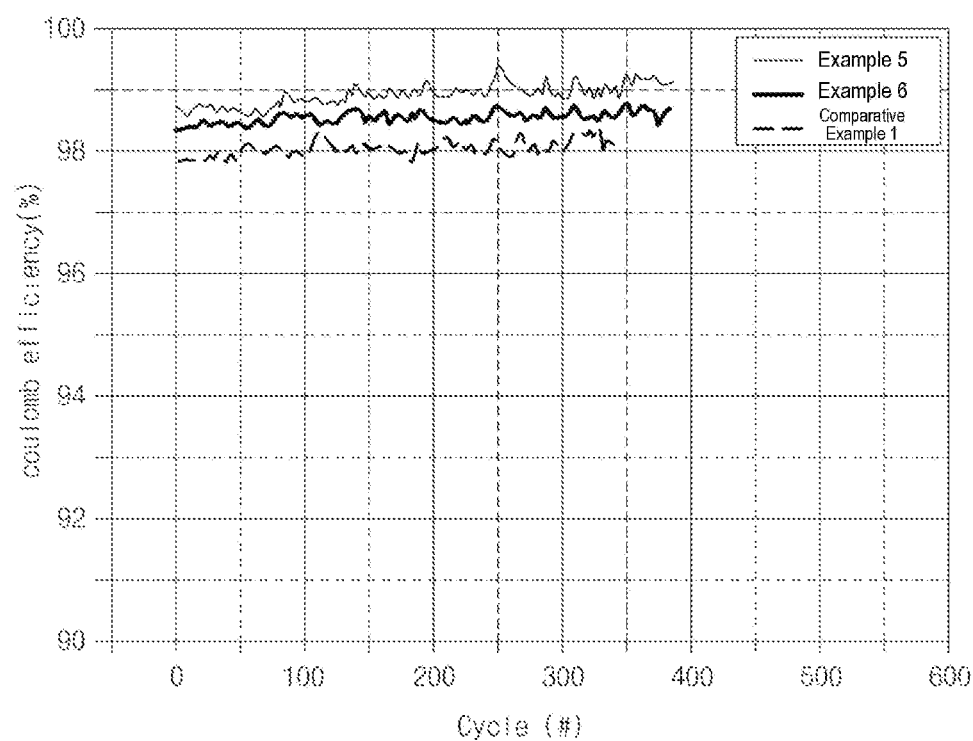
FIG. 8 is a graph illustrating a coulombic efficiency change when lithium secondary batteries of Examples 5 and 6 and Comparative Example 1 are charged/discharged 400 times.

Referring to FIGS. 7 and 8, it can be found out that the lithium secondary battery according to the present disclosure has excellent charging/discharging performance. For example, it was found out that although the lithium secondary battery of each of Examples 5 and 6 according to the present disclosure includes the coating layer having the predetermined volume resistance on the negative electrode surface, in the lithium secondary batteries according to the present disclosure, the charging/discharging capacity is almost the same as that in the lithium secondary battery of Comparative Example 1 in which the coating layer is not provided (FIG. 7), and the coulombic efficiency is higher than that in the lithium secondary battery of Comparative Example 1, by about 2% or more on average (FIG. 8).

From these results, it can be found out that since the lithium secondary battery according to the present disclosure includes a coating layer having a predetermined volume resistance on a negative electrode active layer, not only the safety against the internal short is excellent, but also the charging/discharging performance is excellent over the conventional lithium secondary batteries.

So far, although the present disclosure has been described with reference to embodiments, a person skilled in the relevant technical field or a person with ordinary skill in the relevant technical field will understand that various modifications and changes can be made to the present disclosure within a scope not departing from the spirit and technical area of the present disclosure described in the patent claims to be described later.

Therefore, the technical scope of the present disclosure is not limited to the contents described in the detailed description of the specification, but should be determined by the patent claims.

LIST OF REFERENCE NUMERALS

10: lithium secondary battery system
110: cell assembly
111: lithium secondary battery
111a: positive electrode of lithium secondary battery
111b: negative electrode of lithium secondary battery
120: charging/discharging unit
130: sensing unit
140: controller
144: memory
146: communication I/F
148: input/output I/F
150: battery pack
PS: external power source
EL: electric load
211: lithium secondary battery for experiments
211a-1: positive electrode current collector
211a-2: positive electrode active layer
211b-1: negative electrode current collector
211b-2: negative electrode active layer
211b-3: negative electrode coating layer
211c: separator
211c-1: hollow central portion of separator

What is claimed is:

1. A negative electrode for a lithium secondary battery, the negative electrode comprising:
   a negative electrode active layer provided on at least one surface of a negative electrode current collector, and including a negative electrode active material; and
   a coating layer disposed on the negative electrode active layer,
   wherein the coating layer contains silicon-containing particles, aluminum-containing particles and a dispersant, and
   a volume resistance of the negative electrode is $1.0 \times 10^{-4}$ Ω·cm to 1.0 Ω·cm.

2. The negative electrode for the lithium secondary battery according to claim 1, wherein the negative electrode has the volume resistance of $3.0 \times 10^{-3}$ Ω·cm to $9.0 \times 10^{-1}$ Ω·cm.

3. The negative electrode for the lithium secondary battery according to claim 1, wherein
   the silicon-containing particles contain particles in which a ratio of a silicon element and an oxygen element is 1:0.5 to 2.0.

4. The negative electrode for the lithium secondary battery according to claim 1, wherein
   the aluminum-containing particles contain a metal compound represented by the following Formula 1:

$$Al_pO_q(OH)_r \qquad \text{[Chemical Formula 1]}$$

in the Formula 1,
   p is an integer of 1 to 10, q is an integer of 0 to 20, and p≤q, and
   r is an integer of 1 to 5.

5. The negative electrode for the lithium secondary battery according to claim 1, wherein
   the aluminum-containing particles include one or more types of boehmite, pseudoboehmite, diaspore, akdalaite and aluminium trihydroxide.

6. The negative electrode for the lithium secondary battery according to claim 1, wherein the silicon-containing particles have an average particle size ($D_{50}$) of 0.5 µm to 10 µm, and the aluminum-containing particles have an average particle size ($D_{50}$) of 0.1 µm to 3.0 µm.

7. The negative electrode for the lithium secondary battery according to claim 1, wherein
the silicon-containing particles include a carbon layer on surfaces thereof.

8. The negative electrode for the lithium secondary battery according to claim 1, wherein
the coating layer contains
1% to 30% by weight of silicon-containing particles;
30% to 89% by weight of aluminum-containing particles; and
10% to 40% by weight of dispersant relative to a total weight.

9. The negative electrode for the lithium secondary battery according to claim 1, wherein
the dispersant includes:
a first dispersant including one or more carboxylic acids groups; and
a second dispersant including one or more amino groups.

10. The negative electrode for the lithium secondary battery according to claim 1, wherein
the coating layer further includes one or more types of binders among styrene butadiene rubber (SBR), polyvinylidenefluoride (PVdF), polyacrylic acid (PAA), polyalkylacrylate, polyamide (PA) and polystyrene (PS).

11. A lithium secondary battery comprising: a positive electrode, the negative electrode according to claim 1, and a separator disposed between the positive electrode and the negative electrode.

12. The lithium secondary battery according to claim 11, wherein
the positive electrode includes a positive electrode active layer on a positive electrode current collector, the positive electrode active layer containing one or more types of positive electrode active materials among compounds represented by the following Formulas 2 and 3:

$$LiFe_aM^1_{1-a}XO_4 \qquad \text{[Chemical Formula 2]}$$

$$Li_x[Ni_yCo_zMn_wM_v^2]O_2$$

in the Formulas 2 and 3, $M^1$ is one or more types of W, Cu, Fe, V, Cr, Co, Ni, Mn, Ti, Zr, Zn, Al, In, Ta, Y, La, Sr, Ga, Sc, Gd, Sm, Ca, Ce, Nb, Mg, B, or Mo, X is one or more of P, Si, S, As or Sb, a satisfies $0<a\leq1.0$, $M^2$ is one or more types of W, Cu, Fe, V, Cr, Ti, Zr, Zn, Al, In, Ta, Y, La, Sr, Ga, Sc, Gd, Sm, Ca, Ce, Nb, Mg, B, or Mo, and x, y, z, w and v satisfy $1.0\leq x\leq1.30$, $0\leq y<1$, $0\leq z\leq1$, $0\leq w\leq1$, $0\leq v\leq0.1$ respectively, and $y+z+w+v=1$.

13. A lithium secondary battery system comprising:
a plurality of cell assemblies each including n lithium secondary batteries according to claim 11 where n is an integer of 3 to 100;
a charger/discharger electrically coupled to each of the cell assemblies to individually charge or discharge each of the cell assemblies;
a sensing unit electrically coupled to an electrode of each lithium secondary battery included in the cell assemblies to individually measure at least one type of electricity amount between an electric voltage and an electric current of each lithium secondary battery during charging/discharging of each lithium secondary battery; and
a control part electrically coupled to the charger/discharger and the sensor to control charging or discharging of each of the cell assemblies;
wherein when the electricity amount of a corresponding lithium secondary battery measured by the sensor satisfies a predetermined value, the control part stops charging or discharging of a cell assembly including the corresponding lithium secondary battery.

14. The lithium secondary battery system according to claim 13, wherein the control part performs:
selecting a cell assembly having error rate of about 5% or more, in comparison between an average electricity amount of the cell assemblies and an electricity amount of an individual cell assembly;
among individual lithium secondary batteries provided in the corresponding cell assembly selected at the selecting, determining that an internal short has occurred in a corresponding lithium secondary battery having electricity amount measured by the sensor is lower than an applied electricity amount of each lithium secondary battery by about 0.5% or more; and
stopping charging or discharging of the cell assembly including the corresponding lithium secondary battery determined to be internally short-circuited.

15. The lithium secondary battery system according to claim 13, wherein
the sensing unit further includes a temperature measurement sensor configured to measure a temperature of each lithium secondary battery provided in the cell assembly.

16. A method of operating a lithium secondary battery system, the method comprising:
selecting a cell assembly having error rate of about 5% or more, in comparison between an average electricity amount of cell assemblies and an electricity amount of an individual cell assembly in a lithium secondary battery system according to claim 13;
among individual lithium secondary batteries provided in the corresponding cell assembly selected at the selecting, determining that an internal short has occurred in a corresponding lithium secondary battery having electricity amount measured by a sensor is lower than an applied electricity amount of each lithium secondary battery by about 0.5% or more; and
stopping charging or discharging of the cell assembly including the corresponding lithium secondary battery determined to be internally short-circuited.

* * * * *